US008225041B2

(12) United States Patent
Fujita et al.

(10) Patent No.: US 8,225,041 B2
(45) Date of Patent: Jul. 17, 2012

(54) MANAGEMENT METHOD OF PERFORMANCE HISTORY AND A MANAGEMENT SYSTEM OF PERFORMANCE HISTORY

(75) Inventors: Kazuhisa Fujita, Kawasaki (JP); Nobuo Beniyama, Yokohama (JP); Takuya Okamoto, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/344,627

(22) Filed: Jan. 6, 2012

(65) Prior Publication Data
US 2012/0110263 A1 May 3, 2012

Related U.S. Application Data

(63) Continuation of application No. 12/020,085, filed on Jan. 25, 2008, now Pat. No. 8,117,386.

(30) Foreign Application Priority Data

Oct. 31, 2007 (JP) .................................. 2007-282912

(51) Int. Cl.
*G06F 12/00* (2006.01)
(52) U.S. Cl. ..................... 711/114; 711/111; 709/224
(58) Field of Classification Search .................. None
See application file for complete search history.

(56) References Cited

U.S. PATENT DOCUMENTS

| 5,537,585 A | 7/1996 | Blickenstaff et al. |
| 7,096,315 B2 | 8/2006 | Takeda et al. |
| 2002/0099908 A1 | 7/2002 | Yamamoto et al. |
| 2003/0093619 A1 | 5/2003 | Sugino et al. |
| 2003/0221074 A1 | 11/2003 | Satoyama et al. |
| 2004/0068561 A1 | 4/2004 | Yamamoto et al. |
| 2004/0162940 A1 | 8/2004 | Yagisawa et al. |
| 2004/0255080 A1 | 12/2004 | Kihara et al. |
| 2005/0138285 A1 | 6/2005 | Takaoka et al. |
| 2005/0289308 A1 | 12/2005 | Kano |
| 2006/0010341 A1 | 1/2006 | Kodama |
| 2008/0082748 A1 | 4/2008 | Liu et al. |
| 2008/0082777 A1 | 4/2008 | Sakaguchi et al. |
| 2008/0091898 A1 | 4/2008 | Takahashi et al. |
| 2009/0113156 A1 | 4/2009 | Fujita et al. |

FOREIGN PATENT DOCUMENTS

| EP | 1158395 A2 | 11/2001 |
| JP | 200562941 | 3/2005 |

*Primary Examiner* — Reginald Bragdon
*Assistant Examiner* — Baboucarr Faal
(74) *Attorney, Agent, or Firm* — Brundidge & Stanger, P.C.

(57) ABSTRACT

A performance history management method and system are disclosed, in which the time-series performance history such as a volume included in a storage device is managed as one time-series performance history at the time of data rearrangement or device change. The data-oriented performance history providing the logical place of storage of the data stored in the volume is generated using the storage performance monitor program based on the rearrangement history information providing the information on the history of transfer of the data stored in the rearrangement history table and the volume of the storage device by the storage structure information acquisition program, the storage structure information stored in the storage structure information table and the performance history of each volume stored in the storage performance history table by the storage performance information acquisition program. The performance history can be displayed or the performance change detected to display an alert.

18 Claims, 33 Drawing Sheets

FIG. 6

DATA REARRANGEMENT INFORMATION 211

| PRE-REARRANGEMENT LDEVID | POST-REARRANGEMENT LDEVID | REARRANGEMENT START TIME | REARRANGEMENT END TIME |
|---|---|---|---|
| | 1:32/SA1 | | 2001/9/3 13:00 |
| | 1:22/SA1 | | 2001/9/3 14:00 |
| 1:32/SA1 | 2:31/SA2 | 2003/5/1 5:00 | 2003/5/1 6:00 |
| 1:22/SA1 | 3:45/SA2 | 2003/5/1 11:00 | 2003/5/1 12:00 |
| 2:31/SA2 | | 2005/5/3 17:00 | |
| : | : | : | : |

FIG. 8

STORAGE STRUCTURE
INFORMATION TABLE  229

| LDEVID | STORAGE DEVICE ID | ARRAY GROUP ID | ... |
|---|---|---|---|
| 1:30/SA1 | SA1 | AG1-1/SA1 | ... |
| 1:31/SA1 | SA1 | AG1-1/SA1 | ... |
| 1:32/SA1 | SA1 | AG1-1/SA1 | ... |
| 1:33/SA1 | SA1 | AG2-1/SA1 | ... |
| : | : | : | : |
| 2:30/SA2 | SA2 | AG1-2/SA2 | ... |
| 2:31/SA2 | SA2 | AG1-2/SA2 | ... |
| 2:32/SA2 | SA2 | AG1-2/SA2 | ... |
| : | : | : | : |

Columns: 2901, 2902, 2903

FIG. 9

REARRANGEMENT HISTORY TABLE 227

| DATA ID | PRE-REARRANGEMENT LDEVID | POST-REARRANGEMENT LDEVID | REARRANGEMENT START TIME | REARRANGEMENT END TIME |
|---|---|---|---|---|
| A | | 1:32/SA1 | | 2001/9/3 13:00 |
| B | | 1:22/SA1 | | 2001/9/3 14:00 |
| A | 1:32/SA1 | 2:31/SA2 | 2003/5/1 5:00 | 2003/5/1 6:00 |
| B | 1:22/SA1 | 3:45/SA2 | 2003/5/1 11:00 | 2003/5/1 12:00 |
| A | 2:31/SA2 | | 2005/5/3 17:00 | |
| : | : | : | : | : |

STORAGE PERFORMANCE HISTORY TABLE   226

| LDEVID | PERFORMANCE ACQUISITION TIME | PERFORMANCE VALUE (IOPS) |
|---|---|---|
| 1:32/SA1 | 2001/9/3 13:00 | 23 |
| 1:32/SA1 | 2001/9/3 14:00 | 15 |
| 1:32/SA1 | 2001/9/3 15:00 | 12 |
| ... | ... | ... |
| 1:32/SA1 | 2003/5/1 5:00 | 34 |
| 1:22/SA1 | 2001/9/3 13:00 | 21 |
| 1:22/SA1 | 2001/9/3 14:00 | 15 |
| ... | ... | ... |
| 1:22/SA1 | 2003/5/1 0:00 | 67 |
| ... | ... | ... |
| 2:31/SA2 | 2003/5/1 5:00 | 30 |
| 2:31/SA2 | 2003/5/1 6:00 | 45 |
| 2:31/SA2 | 2003/5/1 7:00 | 55 |
| ... | ... | ... |
| 2:31/SA2 | 2005/5/3 17:00 | 40 |
| 3:45/SA2 | 2003/5/1 0:00 | 30 |
| 3:45/SA2 | 2003/5/1 1:00 | 54 |
| ... | ... | ... |

Columns: 1001, 1002, 1003

FIG.12

227 REARRANGEMENT HISTORY TABLE

| Data ID | PRE-REARRANGEMENT LDEVID | POST-REARRANGEMENT LDEVID | REARRANGEMENT START TIME | REARRANGEMENT END TIME | |
|---|---|---|---|---|---|
| A |  | 1:32/SA1 |  | 2001/9/3 13:00 | —1110 |
| B |  | 1:22/SA1 |  | 2001/9/3 14:00 | |
| A | 1:32/SA1 | 2:31/SA2 | 2003/5/1 5:00 | 2003/5/1 6:00 | —1111 |
| B | 1:22/SA1 | 3:45/SA2 | 2003/5/1 1:00 | 2003/5/1 2:00 | |
| A | 2:31/SA2 |  | 2005/5/3 17:00 |  | —1112 |
| ... |  |  |  |  | |

DESIGNATED VALUE
LDEVID=2:31/SA2
→ S901 ACQUIRE DESIGNATED VALUE
→ S902 GENERATE DATA STORAGE HISTORY INFORMATION

226 STORAGE PERFORMANCE HISTORY TABLE

| LDEVID | PERFORMANCE COLLECTION TIME | PERFORMANCE VALUE (IOPS) |
|---|---|---|
| 1:32/SA1 | 2001/9/3 13:00 | 23 |
| 1:32/SA1 | 2001/9/3 14:00 | 15 |
| 1:32/SA1 | 2001/9/3 15:00 | 12 |
| ... | ... | ... |
| 1:32/SA1 | 2003/5/1 5:00 | 34 |
| 1:22/SA1 | 2001/9/3 13:00 | 21 |
| 1:22/SA1 | 2001/9/3 14:00 | 15 |
| ... | ... | ... |
| 1:22/SA1 | 2003/5/1 0:00 | 67 |
| ... | ... | ... |
| 2:31/SA2 | 2003/5/1 5:00 | 30 |
| 2:31/SA2 | 2003/5/1 6:00 | 45 |
| 2:31/SA2 | 2003/5/1 7:00 | 55 |
| ... | ... | ... |
| 2:31/SA2 | 2005/5/3 17:00 | 40 |
| 3:45/SA2 | 2003/5/1 0:00 | 30 |
| 3:45/SA2 | 2003/5/1 1:00 | 54 |
| ... | ... | ... |

1131

1103 DATA STORAGE HISTORY INFORMATION 1120

| STORAGE DESTINATION LDEVID | STORAGE START TIME | STORAGE END TIME |
|---|---|---|
| 1:32/SA1 | 2001/9/3 13:00 | 2003/5/1 5:00 |
| 2:31/SA2 | 2003/5/1 6:00 | 2005/5/3 17:00 |

→ 1121 GENERATE DATA-ORIENTED PERFORMANCE HISTORY
→ S903

1104 DATA-ORIENTED PERFORMANCE HISTORY 1140

| LDEVID | PERFORMANCE COLLECTION TIME | PERFORMANCE VALUE (IOPS) |
|---|---|---|
| 1:32/SA1 | 2001/9/3 13:00 | 23 |
| 1:32/SA1 | 2001/9/3 14:00 | 15 |
| 1:32/SA1 | 2001/9/3 15:00 | 12 |
| ... | ... | ... |
| 1:32/SA1 | 2003/5/1 5:00 | 34 |
| 2:31/SA2 | 2003/5/1 6:00 | 45 |
| 2:31/SA2 | 2003/5/1 7:00 | 55 |
| ... | ... | ... |
| 2:31/SA2 | 2005/5/3 17:00 | 40 |

ALERT CONDITIONS

| PERFORMANCE INDEX 1807 | THRESHOLD VALUE 1808 | APPLICATION/NON-APPLICATION 1809 |
|---|---|---|
| AVERAGE VALUE | 30% | ● APPLY ○ NOT APPLY |
| WORST VALUE | 40% | ● APPLY ○ NOT APPLY |
| CHANGE WIDTH | 0% | ○ APPLY ● NOT APPLY |

ALERT LIST

| | VOLUME ID 1802 | DATE ▼ 1803 | AVERAGE VALUE DETERIORATION RATE ▼ 1804 | WORST VALUE DETERIORATION RATE ▼ 1805 | CHANGE WIDTH DETERIORATION RATE ▼ 1806 |
|---|---|---|---|---|---|
| 1 | 2:31/SA2 | 2003/5/1 | 42% | 45% | 10% |
| 2 | 3:45/SA2 | 2003/5/1 | 35% | 51% | 20% |
| 3 | 2:32/SA2 | 2003/4/30 | 30% | 35% | 9% |
| 4 | | | | | |

FIG.28

VIRTUAL STORAGE STRUCTURE INFORMATION TABLE 1929

| VIRTUAL LDEVID 3001 | VIRTUAL STORAGE DEVICE ID 3002 | VIRTUAL ARRAY GROUP ID 3003 | REAL LDEVID 3004 | REAL STORAGE DEVICE ID 3005 | REAL ARRAY GROUP ID 3006 |
|---|---|---|---|---|---|
| 2:14/USP | USP | AG1-1/USP | 1:31/DF1 | DF1 | AG1-1/DF1 |
| 2:15/USP | USP | AG1-1/USP | 1:32/DF1 | DF1 | AG1-1/DF1 |
| 2:16/USP | USP | AG1-1/USP | 1:33/DF1 | DF1 | AG1-1/DF1 |
| 2:17/USP | USP | AG2-1/USP | 1:34/DF1 | DF1 | AG2-1/DF1 |
| .. | .. | .. | .. | .. | .. |
| 3:14/USP | USP | AG1-2/USP | 2:30/DF2 | DF2 | AG1-2/DF2 |
| 3:15/USP | USP | AG1-2/USP | 2:31/DF2 | DF2 | AG1-2/DF2 |
| 3:16/USP | USP | AG1-2/USP | 2:32/DF2 | DF2 | AG1-2/DF2 |
| .. | .. | .. | .. | .. | .. |

MANAGEMENT METHOD OF PERFORMANCE HISTORY AND A MANAGEMENT SYSTEM OF PERFORMANCE HISTORY

INCORPORATION BY REFERENCE

The present application is a continuation of application Ser. No. 12/020,085, filed Jan. 25, 2008 now U.S. Pat. No. 8,117,386; which claims priority from Japanese application JP2007-282912 filed on Oct. 31, 2007, the content of which is hereby incorporated by reference into this application.

BACKGROUND OF THE INVENTION

This invention relates to a performance history management method and a performance history management system wherein the time-series performance history of the data, stored in a plurality of volumes in a storage device as the result of data rearrangement or device change, can be managed and displayed as a single time-series performance history.

In the operation management of a storage device, one of the important jobs is to monitor the performance of resources such as the volumes included in the storage device. The performance indexes used in monitoring the performance include the access frequency per unit time (input/output per second (IOPS)) and the CPU availability (busy rate). In order to acquire and display the performance history based on these indexes, the conventional technique as disclosed in JP-A-2005-62941 (Patent Document 1) has been used.

According to the technique disclosed in Patent Document 1, a server (management server), collecting the performance information, can periodically sample the structure information and the performance information of the resources included in a storage device, and processing the sampled information into a graph of the time-series performance history, can display it on a screen.

Recently, the integration and increase in size of the storage device has promoted a great development of the storage virtualization technique. In the storage virtualization technique, the volume of a given storage device is made available for use to another storage device in form of a virtual volume in a system with a host client and storage devices connected through a storage area network (SAN). By using this storage virtualization technique, the host client can use the volume without being conscious of the relation between the virtual volume providing a logical location of the volume and the real volume providing a physical location of the volume in which the data is actually stored.

Further, the on-line migration between storage devices has come to appear as one of the storage virtualization techniques. In the on-line migration, the storage devices are interconnected by a data bus for data transfer, so that the data are transferred between the storage devices while maintaining the data access from the host client connected to the storage device of a transferer, and upon complete data transfer, the connection can be connected to the storage device of a transferee.

SUMMARY OF THE INVENTION

With the development of the storage virtualization technique as described above, the operation management of the storage devices is required taking the places of logical storage and physical storage of the data in the volumes into consideration. Conventionally, the performance of the storage devices is monitored for each storage device or for each physical resource such as a volume included in the storage device. In monitoring the performance of the storage devices using the storage virtualization technique, however, the need has arisen to monitor the performance of the data transferee volume in sequent to the data transferee volume when the data is transferred between volumes, in order to acquire the time-series performance history from the viewpoint of logical place of data storage.

Specifically, with regard to the volumes at the data transferer and the data transferee, it is necessary to monitor:

(1) The change in the performance history of the volumes based on the performance indexes designated.
(2) The change in the performance history of the resources related to the volumes to be monitored.
(3) The time-series change in the performance history over long and mid terms.

In the conventional products and techniques for storage management, as described in Patent Document 1, the performance information to be monitored is managed only in terms of the hardware resources such as the storage devices and volumes providing physical places of data storage. This has posed the problem that the performance cannot be monitored from the viewpoint of logical data storage.

The present invention has been achieved to solve this problem, and the object thereof is to provide a performance history management method and a performance history management system using the storage virtualization technique and the on-line migration between storage devices, wherein the performance history of the volumes at the transferer and the transferee can be managed by relating them to each other before and after data transfer between the volumes, and thus the performance can be monitored in the manner as described in (1) to (3) above from the viewpoint of logical data storage even at the time of data transfer between volumes.

In the description that follows, the time-series performance history acquired from the viewpoint of logical place of data storage with data transfer between volumes described above is referred to as "the data-oriented performance history".

According to this invention, in order to solve the aforementioned problems, the information on the data-oriented performance history (data-oriented performance history information) are managed based on the information on the history of data transfer from one volume to another in storage devices and the time-series performance history of each volume.

According to this invention, the time-series performance history of storage devices and the resources such as the volumes included in the storage devices can be monitored as one continuous time-series data-oriented performance history at the time of data rearrangement or device change.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram for explaining the data structure of the data rearrangement information.

FIG. 8 is a diagram for explaining the volume structure information as an example of the data structure of a storage structure information table in the management server.

FIG. 9 is a diagram for explaining the data structure of a rearrangement history table in the management server.

FIG. 10 is a diagram for explaining the data structure of a storage performance history table in the management server.

FIG. 12 is a diagram for explaining the steps of generating the data-oriented performance history for the storage performance monitor program of the management server.

FIG. 14 is a diagram for explaining an example of the alert display screen in the management client.

FIG. 28 is a diagram for explaining the virtual volume structure information as an example of the data structure of the virtual storage structure information table in the management server.

DETAILED DESCRIPTION OF THE EMBODIMENTS

The best mode for carrying out the invention (hereinafter referred to as an embodiment) is explained in detail below with reference to the drawings.

First Embodiment

Figure 1:
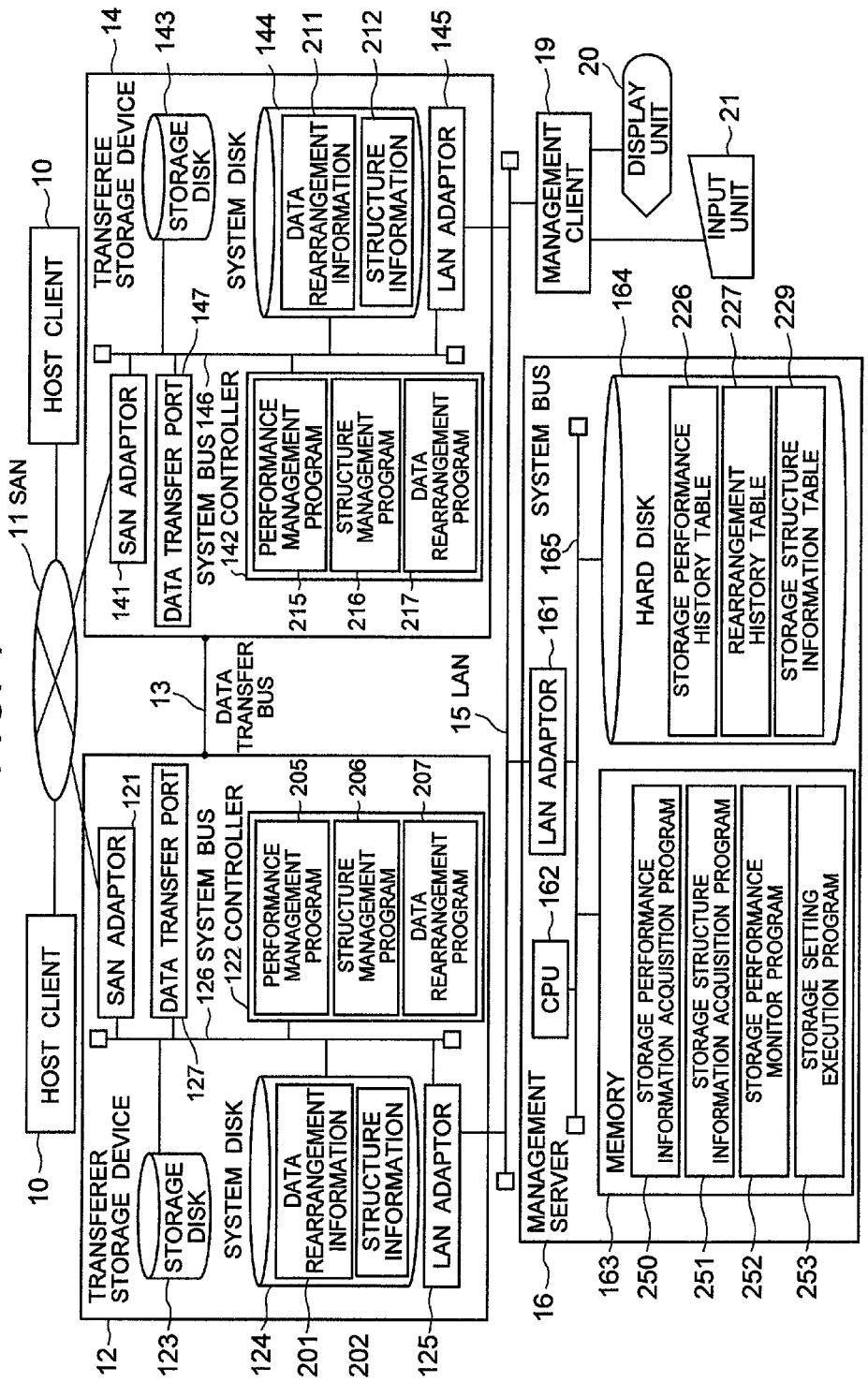
FIG. 1 is a diagram showing the configuration of the system according to a first embodiment of the invention.

FIG. 1 is a diagram showing the configuration of a system according to a first embodiment of the invention. This system includes one or a plurality of host clients 10, a transferer storage device 12 and a transferee storage device 14 connected to each other by a SAN 11. Also, the transferer storage device 12, the transferee storage device 14, a management server 16 and a management client 19 are connected to each other by a LAN (local area network) 15.

The transferer storage device 12 includes a SAN adaptor 121, a controller 122, a storage disk 123, a system disk 124, a LAN adaptor 125 and a data transfer port 127 connected to each other by a system bus 126. A performance management program 205, a structure management program 206 and a data rearrangement program 207 are stored on the controller 122. The data rearrangement information 201 and the structure information 202 are stored on the system disk 124.

The transferee storage device 14 has a similar configuration to the transferer storage device 12 and includes a SAN adaptor 141, a controller 142, a storage disk 143, a system disk 144, a LAN adaptor 145 and a data transfer port 147 connected to each other by a system bus 146. A performance management program 215, a structure management program 216 and a data rearrangement program 217 are stored on the controller 142. The data rearrangement information 211 and the structure information 212 are stored in the system disk 144.

The data transfer path 13 providing a data bus for data transfer is used for transferring the data from the storage disk 123 of the transferer storage device 12 to the storage disk 143 of the transferee storage device 14 by connecting the data transfer port 127 of the transferer storage device 12 and the data transfer port 147 of the transferee storage device 14 to each other at the time of executing the on-line migration.

The management server 16 is a computer including a LAN adaptor 161, a CPU 162, a memory 163 and a hard disk 164 connected by a system bus 165.

A storage performance information acquisition program 250, a storage structure information acquisition program 251, a storage performance monitor program 252 and a storage setting execution program 253 are stored on the memory 163. A storage performance history table 226, a rearrangement history table 227 and a storage structure information table 229 are stored on the hard disk 164.

The management client 19 is a computer connected with a display unit 20 and an input unit 21. The input unit 21 is a device such as a keyboard or a mouse for giving an instruction to the computer. This device is used by the system user to give an instruction to the programs of the management server 16 utilizing the management client 19. The management client 19 notifies the instruction input from the input unit 21 to the management server 16. The display unit 20 is a device such as a liquid crystal display for displaying the screen in compliance with the request from the computer, and in accordance with the request from the programs on the management server 16, is used by the management client 19 to display a setting screen for the program of the management server 16 or a graph of the performance history output from the programs of the management server 16.

Figure 2:
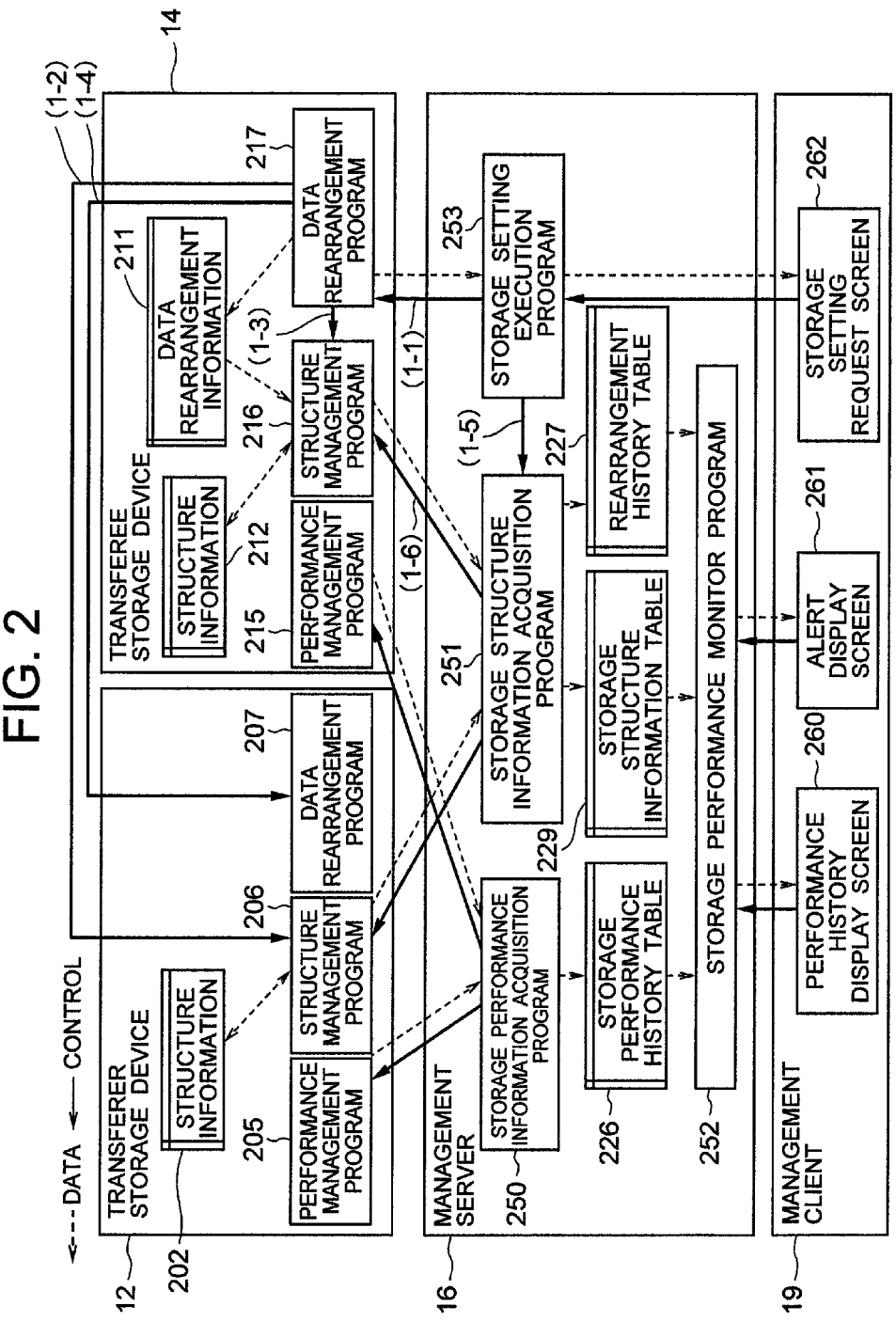
FIG. 2 is a diagram showing the modular relation between the programs operated on the management server and the programs operated on the storage devices of the transferer and the transferee.

FIG. 2 is a diagram showing the modular relation between the programs operated on the management server and the programs operated on the transferer storage device and the transferee storage device. This relation is explained as required below with reference to FIG. 1. The programs operated on the management server 16 and the programs operated on the transferer storage device 12 and the transferee storage device 14 are operated in accordance with the instruction input from the input unit 21 to a performance history display screen 260 (FIG. 16), an alert display screen 261 (FIG. 14) and a storage setting request screen 262 (FIG. 3) displayed on the display unit 20 of the management client 19. Incidentally, each of these screens is described later at the time of the detailed explanation of the programs operated on the management server 16.

First, assume that an instruction is input through the storage setting request screen 262 of the management client 19. The storage setting process is executed according to the storage setting execution program 253 of the management server 16. The processing steps of each program are explained in the case where the data transfer from the transferer storage device 12 to the transferee storage device 14 is instructed as a storage setting process. These processing steps correspond to (1-1) to (1-6) in FIG. 2.

(1-1) Based on the instruction on the storage setting request screen 262, the storage setting execution program 253 of the management server 16 requests the data rearrangement program 217 of the transferee storage device 14 to transfer the data from the transferer storage device 12.

(1-2) The data rearrangement program 217 of the transferee storage device 14 acquires the structure information 202 stored in the system disk 124 through the structure management program 206 of the transferer storage device 12. The structure information 202 is the information on the resources included in the storage devices. With regard to a volume, for example, the structure information 202 includes an LDEVID being an identifier for specifying the particular volume, a storage device ID being an identifier for specifying a storage device containing the volume and an array group ID being an identifier for specifying the array group of the volume source.

(1-3) The data rearrangement program 217 of the transferee storage device 14 instructs the structure management program 216 of the transferee storage device 14 to set the storage disk 143 to the same structure as the storage disk 123 of the transferer storage device 12. The structure management program 216, based on the structure information 202, sets the storage disk 143 and stores the set contents as structure information 212 in the system disk 144.

(1-4) The data rearrangement program 217 of the transferee storage device 14, in collaboration with the data rearrangement program 207 of the transferer storage device 12, moves the data stored in the storage disk 123 of the transferer storage device 12 to the storage disk 143 of the transferee storage device 14. The result of data transfer is stored in the system disk 144 as data rearrangement information 211.

In the case where the data is previously transferred to the transferer storage device 12 from other storage devices, the data rearrangement information 201 of the transferer storage device 12 has stored therein the result of the previous data transfer. This information is succeeded to by the data rearrangement information 211 of the transferee storage device 14 at the time of data transfer to the transferee storage device 14 from the transferer storage device 12. The data structure of the data rearrangement information 211 is described later with reference to FIG. 6.

(1-5) The storage setting execution program 253 requests the storage structure information acquisition program 251 to acquire the data rearrangement information 211 and the structure information 212 from the transferee storage device 14.

(1-6) The storage structure information acquisition program 251 requests the structure management program 216 of the transferee storage device 14 to acquire the data rearrangement information 211 and the structure information 212 stored in the system disk 144. The data rearrangement information 211 thus acquired, after adding the information on DataID thereto, is stored as new information in the rearrangement history table 227. The manner in which DataID is attached is described later with reference to FIG. 7. Also, the data structure of the rearrangement history table 227 is described later with reference to FIG. 9. The structure information 212 thus acquired is stored in the storage structure information table 229. The data structure of the storage structure information table 229 is explained later with reference to FIG. 8.

Next, an explanation is given about the processing steps of the storage performance monitor program 252 with the alert conditions input to the alert display screen 261 of the management client 19.

The storage performance monitor program 252 acquires the performance history of the volumes of the data transferer and the data transferee by using the rearrangement history table 227 and the storage performance history table 226. In the case that a volume, that is shown in the performance history acquired in this step, generates big enough performance change to satisfy the pre-designed alert condition, the alert information of the particular volumes is output to the alert display screen 261.

Next, an explanation is given about the processing steps of the storage performance monitor program 252, when the performance history display conditions, which are the resources and performance indexes to be displayed and the display format, are input to the performance history display screen 260 of the management client 19.

In the storage performance monitor program 252, the time-series performance history of the resources with the designated performance indexes before and after the data transfer is generated from the information acquired from the storage performance history table 226, the storage structure information table 229 and the rearrangement history table 227, and a time-series performance history graph is output to the display unit 20 of the management client 19 in the designated display format.

Next, the storage performance information acquisition program 250 is explained.

The storage performance information acquisition program 250 operates not in response to the instruction from the screen of the management client 19 but periodically at predetermined intervals. From the performance management program 205 of the transferer storage device 12 and the performance management program 215 of the transferee storage device 14, the performance information of the transferer storage device 12 and the transferee storage device 14 are periodically acquired and stored in the storage performance history table 226. The data structure of the storage performance history table 226 is explained later with reference to FIG. 10.

The manner in which each program on the management server 16 is processed is explained in detail below with reference to FIGS. 3 to 14. FIGS. 1 and 2 are also referred to as required.

Figure 3:
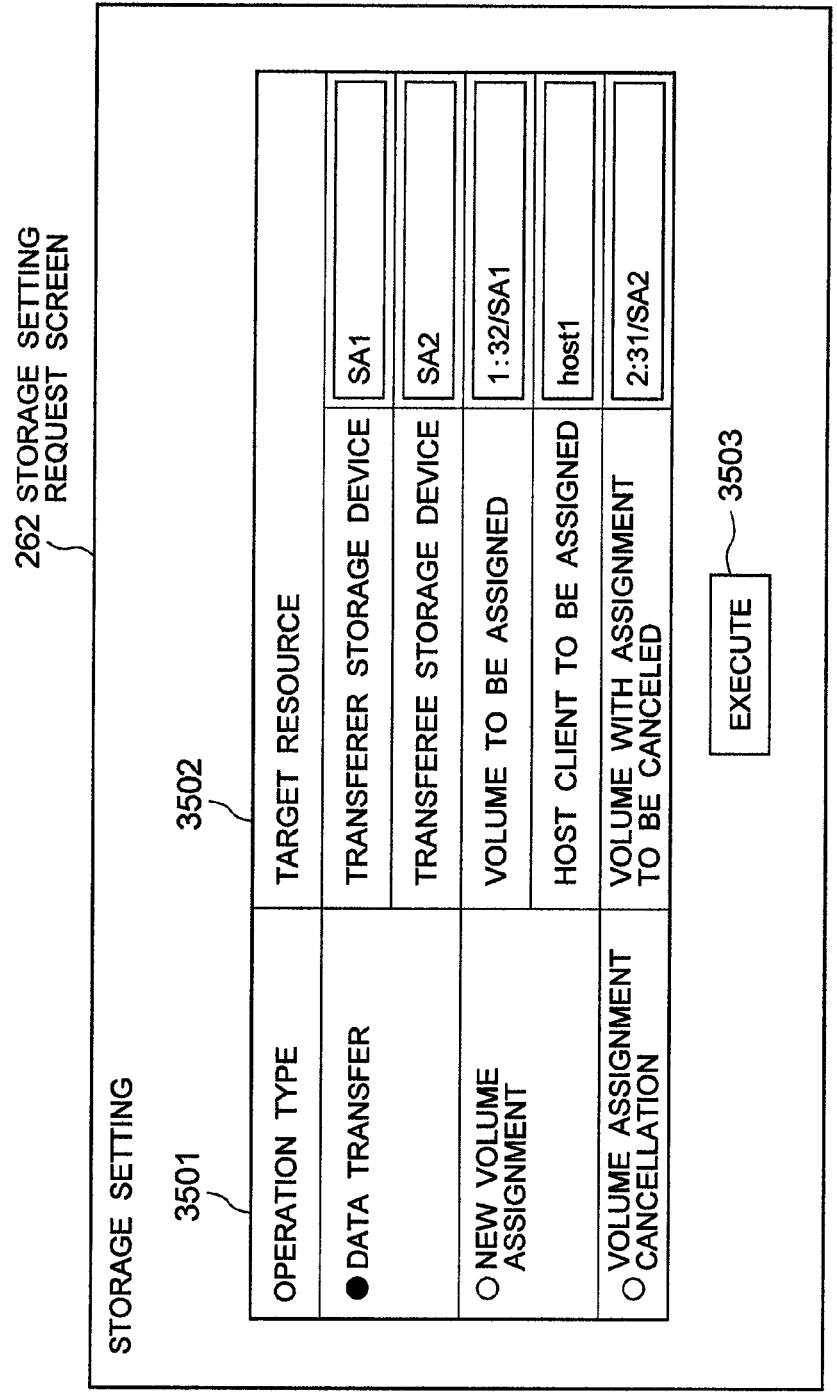
FIG. 3 is a diagram for explaining an example of the contents displayed on a storage setting request screen.

FIG. 3 is a diagram for explaining an example of the contents displayed on the storage setting request screen. The storage setting request screen 262 includes an operation type 3501, a target resource 3502 and an execution button 3503. First, the user selects any one of data transfer, new volume assignment and volume assignment cancellation from the operation type 3501 through the storage setting request screen 262. The data is transferred between the designated storage devices. The new volume assignment is carried out in such a manner that the designated volume can be used from the designated host client. The volume assignment is canceled to cancel the volume assignment to the host client so that the designated volume cannot be used by the host client.

In the case where the data transfer is selected from the operation type 3501 (by radio buttons), the storage device ID for specifying the storage devices of the transferer and the transferee is designated as the target resource 3502. A name by which each storage device can be uniquely identified is selected as a storage device ID from the model number or the serial number of the storage device. In the case where the new volume assignment is selected from the operation type 3501, the identifier LDEVID of the volume to be newly assigned and the name of the assignee client host are designated as the object of operation 3500. In the case where the volume assignment cancellation is selected from the operation type 3501, on the other hand, the LDEVID of the volume of which the assignment is to be canceled is designated as the target resource 3502.

According to this embodiment, LDEVID is described in the following format:

LDEVID=LDEV number 1: LDEV number 2/storage device ID

LDEV number 1: LDEV number 2 indicates the number for uniquely specifying the volume in the storage device specified by the storage device ID. The LDEV number 1 indicates the number of the management unit including the volume in the storage device, and constitutes a unique number in the storage device. The LDEV number 2, on the other hand, indicates the number of the volume in the management unit and constitutes a unique value in the management unit. As a result, the volume can be uniquely specified by the LDEVID described above.

By designating the operation type 3501 and the target resource 3502 and clicking or pushing the execution button 3503, the management client 19 notifies the request for storage setting to the management server 16.

Figure 4:
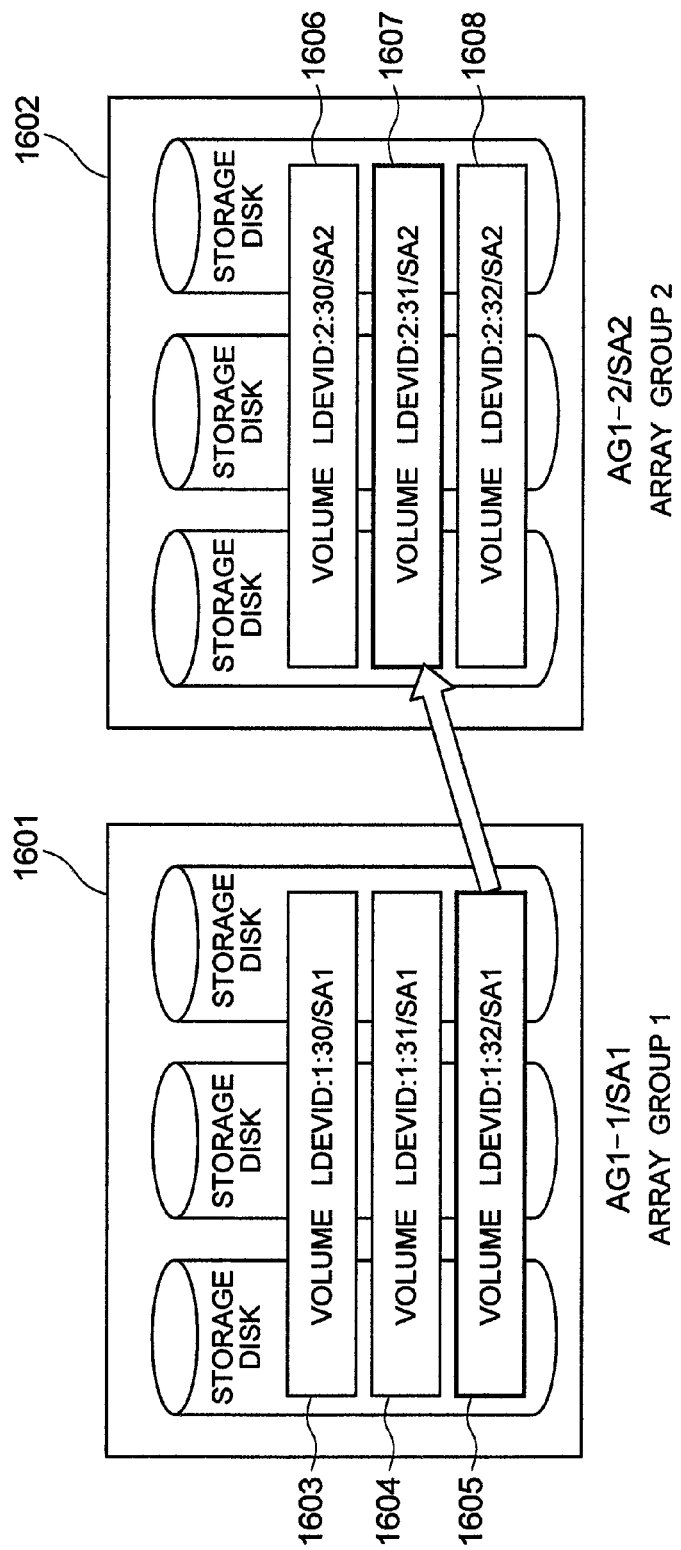
FIG. 4 is a diagram for explaining the relation between volume and array group at the time of data transfer between volumes.

FIG. 4 is a diagram for explaining the relation between volume and array group at the time of data transfer between volumes. The array group is defined as a plurality of storage disks configured as RAID (redundant arrays of inexpensive disks) in the storage device. A plurality of volumes can be generated on the array group. The reliability of the volumes generated on the array group can be improved by configuring RAID1, RAID5, etc.

As shown in FIG. 4, the data is transferred from the data transferer volume 1605 with LDEVID of 1:32/SA1 included in the array group 1 (1601) to the data transferee volume 1607 with LDEVID of 2:31/SA2 included in the array group 2 (1602). The array group 1 (1601) includes the volumes 1603, 1604, 1605, while the array group 2 (1602) includes the volumes 1606, 1607, 1608.

The data transfer between volumes of different array groups has an effect on the performance of the array group and the volumes included in the array group. Specifically, by transferring the data of the data transferer volume 1605 to the data transferee volume 1607 included in another array group, the performance of the array group 1 itself and the volumes 1603, 1604 included in the array group 1 is expected to be improved.

Figure 5:
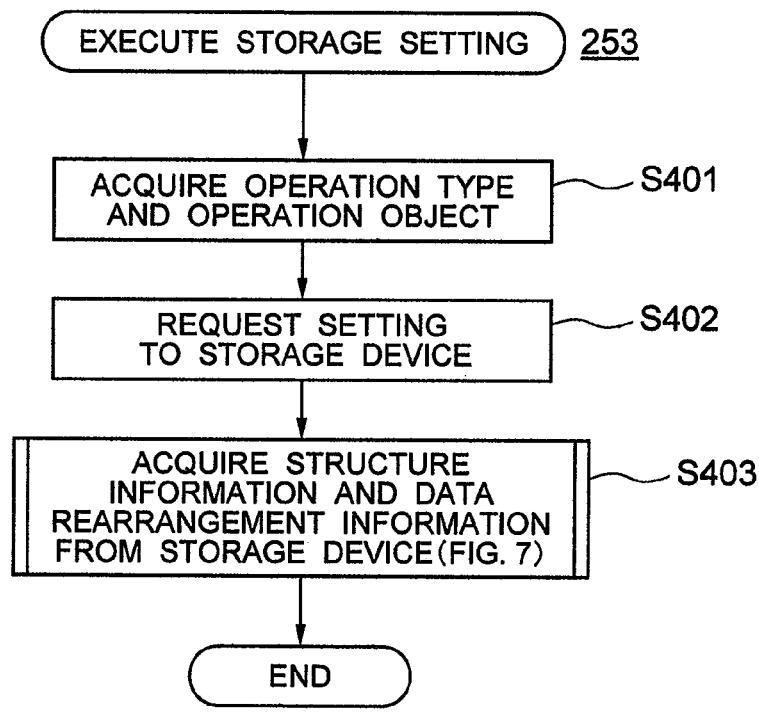
FIG. 5 is a flowchart showing the steps of executing the storage setting execution program in the management server.

FIG. 5 is a flowchart showing the processing steps of the storage setting execution program in the management server, and explained as required with reference to FIGS. 1 and 2. The storage setting execution program 253, first in step S401, acquires the information on the target resource 3502 and the operation type 3501 for storage setting designated on the storage setting request screen 262 (FIG. 3) of the management client 19.

In the case where the operation type 3501 is determined in step S402 and the data transfer is selected, the storage setting execution program 253 requests the data rearrangement program 217 of the transferee storage device 14 to execute the data transfer, which are driven from the information on the target resource 3502 for data transfer acquired in step S401.

The data rearrangement program 217 executes the data transfer from the designated transferer storage device 12. Next, the data rearrangement program 217 stores the rearrangement history of the data for each volume in the system disk 144 as the data rearrangement information 211. The data structure of the data rearrangement information 211 is explained later with reference to FIG. 6. Further, the storage management program 216 stores the structure information on the volumes of the data transferee in the system disk 144 as the structure information 212.

In the case where the new volume assignment is selected as the operation type 3501 in step S402, the data rearrangement program 217 instructs the structure management program 216 to execute the new volume assignment. The structure management program 216 executes the new assignment of the volumes for the transferee storage device 14, and registers the information on the time of new volume assignment as the data rearrangement information 211. Further, the structure information 212 of the newly assigned volume is updated.

In similar fashion, assume that the volume assignment cancellation is selected as the operation type 3501 in the step S402. The data rearrangement program 217 instructs the structure management program 216 to execute the volume assignment cancellation. The structure management program 216 executes the assignment cancellation of the volumes for the transferee storage device 14, and registers the information on the volume assignment cancellation time as the data rearrangement information 211. Further, the structure information 212 of the newly canceled volume assignment is updated.

In step S403, the storage setting execution program 253 requests the storage structure information acquisition program 251 to acquire the data rearrangement information 211 generated by the data rearrangement program 217 and the structure information 212 generated by the structure management program 216.

FIG. 6 is a diagram for explaining the data structure of the data rearrangement information. The data rearrangement information 211 includes the information on the LDEVID before rearrangement (hereinafter referred to as the pre-rearrangement LDEVID) 1701, the LDEVID after rearrangement (hereinafter referred to as the post-rearrangement LDEVID) 1702, the rearrangement start time 1703 and the rearrangement end time 1704. In new volume assignment, the LDEVID of the volume newly assigned is stored as the post-rearrangement LDEVID 1702, and the time of new volume assignment as the rearrangement end time 1704. In volume assignment cancellation, on the other hand, the LDEVID of the volume of which the assignment is canceled is stored in the pre-rearrangement LDEVID 1701, and the time of volume assignment cancellation as the rearrangement start time 1703.

Figure 7:
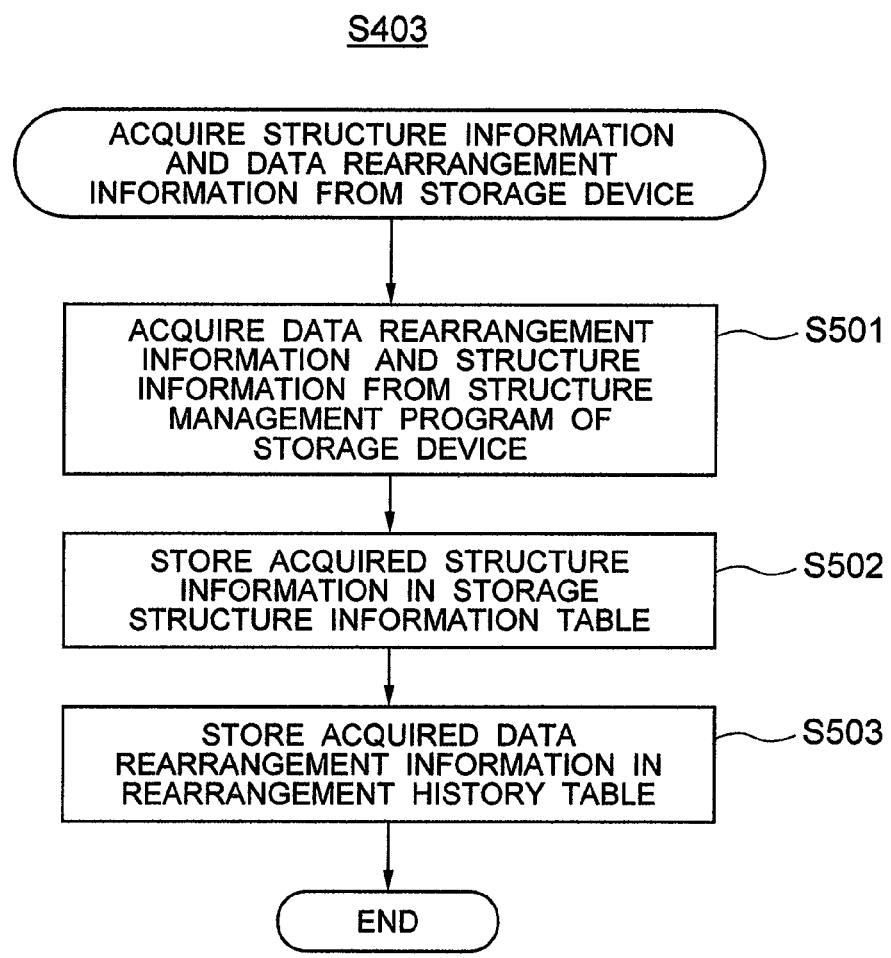
FIG. 7 is a flowchart showing the steps of executing the storage structure information acquisition program in the management server.

FIG. 7 is a flowchart showing the processing steps of the storage structure information acquisition program in the management server. First, in step S501, the storage structure information acquisition program 251 acquires the data rearrangement information 211 and the structure information 212 stored in the system disk 144 from the structure management program 216 of the transferee storage device 14. In step S502, the structure information 212 acquired in step S501 is stored in the storage structure information table 229 (FIG. 8). In step S503, the data rearrangement information 211 acquired in step S501, together with the information on DataID, is stored as new information in the rearrangement history table 227 (FIG. 9).

In step S503, DataID is attached to the data rearrangement information according to the steps shown below. By using the value of the pre-rearrangement LDEVID, a record is retrieved from the records of data rearrangement table, in which the value of the post-rearrangement LDEVID is equal to the pre-rearrangement LDEVID of the data rearrangement information, and thereby DataID of the retrieved record is attached as DataID of the data rearrangement information to be added. Also, at the time of new assignment, the pre-rearrangement LDEVID is absent, and therefore, DataID that has never been assigned is newly generated and assigned.

FIG. 8 is a diagram for explaining the structure information of a volume as an example of the data structure of the storage structure information table in the management server. The storage structure information table 229 for the volume has registered therein such information as the LDEVID 2901, the storage device ID 2902 and the array group ID 2903.

The LDEVID 2901 is an identifier for specifying the volume. The storage device ID 2902 is an identifier for specifying the storage device for storing the volume. The array group ID 2903 is an identifier for specifying the array group for which the volume is generated.

FIG. 9 is a diagram for explaining the data structure of the rearrangement history table in the management server. The rearrangement history table 227 has registered therein the information including the DataID 601, the pre-rearrangement LDEVID 602, the post-rearrangement LDEVID 603, the rearrangement start time 604 and the rearrangement end time 605. The DataID 601 is an identifier of the data stored in the volume.

The pre-rearrangement LDEVID 602 is the LDEVID of the transferer volume storing the data before transfer. In the case where the pre-rearrangement LDEVID 602 is blank, it indicates that the volume is assigned anew.

The post-rearrangement LDEVID 603 is the LDEVID of the transferee volume storing the data after data transfer. In the case where the post-rearrangement LDEVID 603 is blank, it indicates that the volume assignment is canceled.

The rearrangement start time 604 indicates the time point when the data transfer is started or the volume assignment is canceled. The rearrangement end time 605 indicates the time point when the data transfer is completed or the volume is newly assigned.

FIG. 10 is a diagram for explaining the data structure of the storage performance history table in the management server. The storage performance history table 226 has registered therein the information including the LDEVID 1001, the performance acquisition time 1002 and the performance value 1003. The LDEVID 1001 is an identifier of the volume of which the performance is to be acquired. The performance acquisition time 1002 indicates the time point when the performance of the volume is acquired. The performance value 1003 represents the one acquired in time series based on the performance indexes. In FIG. 10, the access frequency (IOPS) per unit time is shown as a performance value. Nevertheless, the other ordinary storage performance indexes, such as the response performance (response time), the data transfer performance (Transfer, the CPU availability (busy rate) and so on, could be stored (in the storage performance history table).

Figure 11:
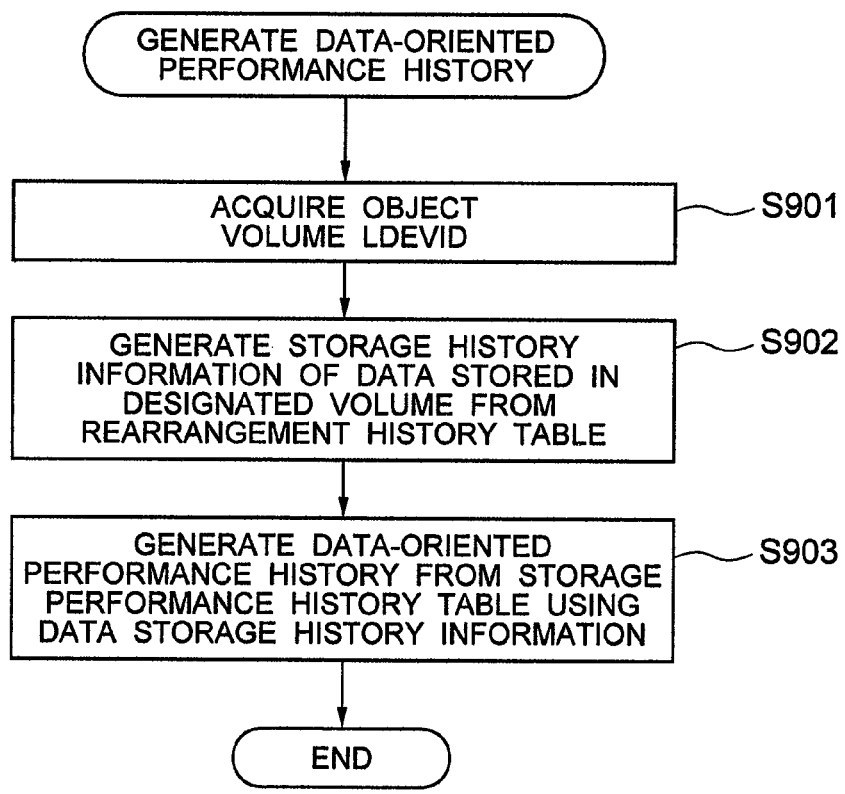
FIG. 11 is a flowchart showing the steps of generating a data-oriented performance history for the storage performance monitor program of the management server.

FIG. 11 is a flowchart showing the steps of generating the data-oriented performance history for the storage performance monitor program of the management server. FIG. 12 is a diagram for explaining the steps of generating the data-oriented performance history for the storage performance monitor program of the management server. With reference to FIGS. 11 and 12, the steps of generating the data-oriented performance history from the data stored in the storage performance history table 226 and the rearrangement history table 227 are explained.

First, in step S901, the storage performance monitor program 252 acquires the LDEVID constituting the information for specifying the volume as designated by a high-order program. In FIG. 12, 2:31/SA2 is designated as a designated value of the LDEVID.

In step S902, the rearrangement history on the volume specified by the information acquired in step S901 is acquired from the rearrangement history table 227, and the information on the destination volume in which the data is stored and the period (or the history information that represents the location, more precisely the LDEVID of the volume, with its located period of the data residing on the specified volume in step S901) are generated as the data storage history information (the data location history information) 1103.

In order to generate the data storage history information 1103, the storage performance monitor program 252 first searches the rearrangement history table 227 and acquires the DataID of the record 1111 for which the LDEVID 2:31/SA2 of the volume acquired in step S901 is identical to the post-rearrangement LDEVID. In the presence of a plurality of records where the post-rearrangement LDEVID is 2:31/SA2, the record with the latest rearrangement end time is selected and the DataID thereof is acquired. In FIG. 12, the DataID of the record 1111 for which the LDEVID is 2:31/SA2 is "A". Next, therefore, all the records with DataID of "A" in the rearrangement history table 227 are acquired. As a result, the record 1110, the record 1111 and the record 1112 can be acquired.

Next, these three records are rearranged in chronological order, so that the post-rearrangement LDEVID for the oldest record 1110 (the same as the pre-rearrangement LDEVID of the next record 1111), the rearrangement end time of the oldest record 1110 and the rearrangement start time of the next record 1111 are acquired and registered as the values of the storage destination LDEVID (the LDEVID of the volume which stores the (target) data), the storage start time and the storage end time, respectively, of the record 1120 of the data storage history information 1103.

In similar fashion, from the record 1111 and the latest record 1112, the post-rearrangement LDEVID of the record 1111 (the same as the pre-rearrangement LDEVID of the record 1112), the rearrangement end time of the record 1111 and the rearrangement start time of the record 1112 are registered as the values of the storage destination LDEVID, the storage start time and the storage end time of the record 1121 of the data storage history information 1103 thereby to generate the data storage history information 1103. In this way, by acquiring all the rearrangement history of A as DataID, the data storage history information 1103 corresponding to the life cycle of the data from the new assignment of the volume to the volume assignment cancellation through the data transfer can be generated.

In step S903, the data-oriented performance history 1104 is generated using the storage performance history table 226 and the data storage history information 1103 acquired in step S902. In FIG. 12, the record of the performance history in which the LDEVID is identical to the storage destination LDEVID and the performance collection time is not before the storage start time but not after the storage end time is acquired from the storage performance history table 226 using the storage destination LDEVID, the storage start time and the storage end time stored in the records 1120, 1121 of the data storage history information 1103 generated in step S902, and registered in the data-oriented performance history 1104. In FIG. 12, a plurality of the records 1130 of the storage performance history table 226 are acquired according to the conditions acquired from the information of the record 1120 of the data storage history information 1103.

Further, according to the conditions acquired from the information of the record 1121 of the data storage history information 1103, a plurality of the records 1131 of the storage performance history table 226 are acquired. These records are registered as a plurality of the records 1140 and a plurality of the records 1141 in the data-oriented performance history 1104 thereby to generate the data-oriented performance history 1104.

Figure 13:
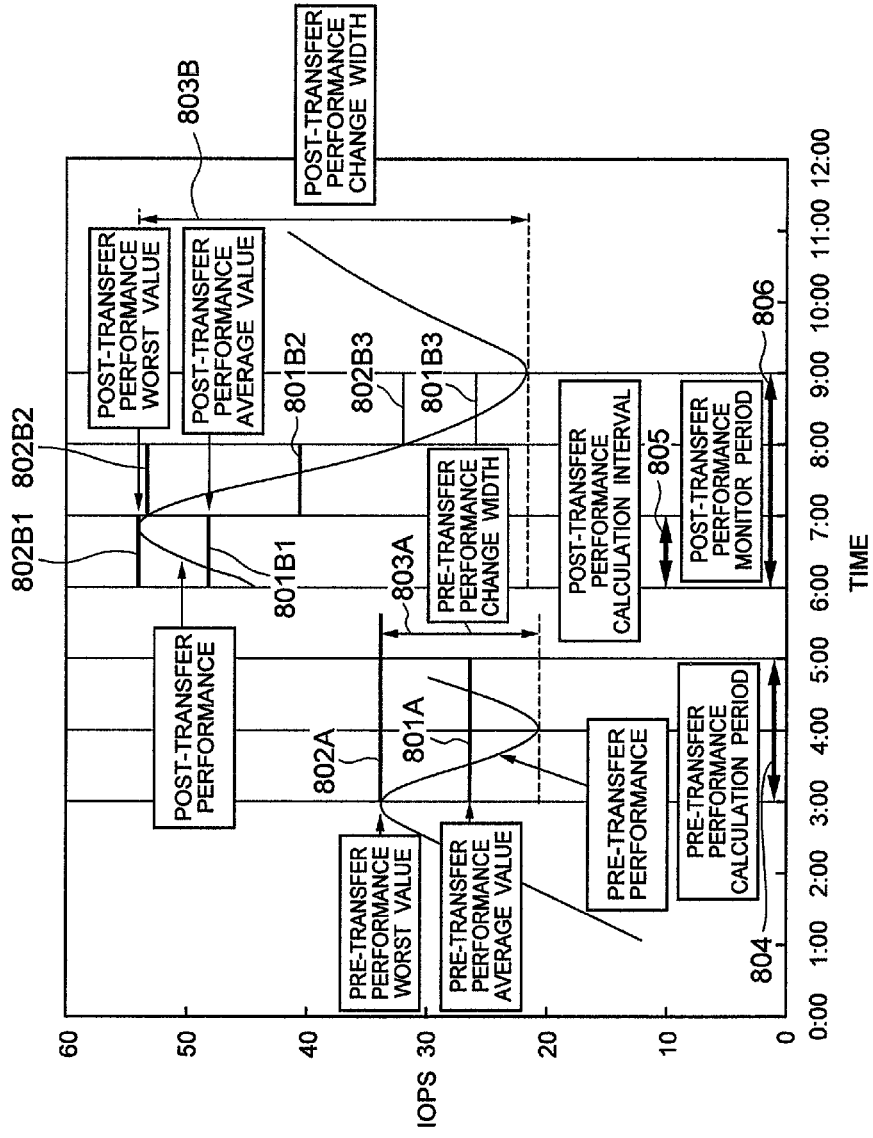
FIG. 13 is a diagram for explaining a method of detecting the deterioration of the performance average value, the performance worst value and the performance change width before and after data transfer using the data-oriented performance history in the alert display process of the storage performance monitor program of the management server.

FIG. 13 is a diagram for explaining the method of detecting the deterioration of the performance average value, the deterioration of the performance worst value and the deterioration of the performance change width before and after data transfer using the data-oriented performance history in the alert display process of the storage performance monitor program in the management sever.

First, the performance average value before data transfer (hereinafter referred to as the pre-transfer performance average value) 801A, the performance worst value before data transfer (hereinafter referred to as the pre-transfer performance worst value) 802A and the performance change width before data transfer (hereinafter referred to as the pre-transfer performance change width) 803A are calculated from the performance value for the performance calculation period before data transfer (hereinafter referred to as the pre-transfer performance calculation period) 804. During the performance monitor period after data transfer (hereinafter referred to as the post-transfer performance monitor period) 806, the performance average value 801B (801B1, 801B2, 801B3 in FIG. 13), the performance worst value 802B (802B1, 802B2, 802B3 in FIG. 13) and the performance change width 803B are calculated for each performance calculation interval after data transfer (hereinafter referred to as the post-transfer performance calculation interval) 805, and compared with the pre-transfer performance average value 801A, the pre-transfer performance worst value 802A and the pre-transfer performance change width 803A, respectively. The post-transfer performance change width 803B is acquired for the whole of the post-transfer performance monitor period 806.

In the case where the deterioration rate of each performance value after data transfer with respect to the performance value before data transfer is not less than a designated threshold value, an alert is generated. The alert thus generated is displayed on the alert display screen 261 (FIG. 14) of the management client 19.

The deteriorate rate is defined as the ratio at which each performance value after data transfer is deteriorated from the performance value before data transfer. Specifically, the deterioration rate (%) of the performance average value is given as $$(801B-801A) \times 100 \div 801A \tag{A1}$$

In similar fashion, the deterioration rate (%) of the performance worst value is given as $$(802B-802A) \times 100 \div 802A \tag{A2}$$

Also, the deterioration rate (%) of the performance change width is given as $$(803B-803A) \times 100 \div 803A \tag{A3}$$

FIG. 14 is a diagram for explaining an example of the alert display screen in the management client. The information on the volume satisfying the conditions for alert generation is output by the storage performance monitor program 252 to the display unit 20 connected to the management client 19, by the detection method shown in FIG. 13. The alert display screen 261 includes the alert conditions and an alert list.

On the alert display screen 261, the threshold value 1808 of the deterioration rate for each index included in the performance index 1807 can be designated as an alert condition. The performance index 1807 that can be designated includes the deterioration rates of the three items including the performance average value, the performance worst value and the performance change width. Also, the threshold value 1808 of the deterioration rate of each performance index and the application/non-application 1809 of each performance index to the alert conditions can be designated. The alert display screen 261 displays thereon a table of a list of alerts including the volume ID 1802, the data 1803, the average value deterioration rate (the performance average value deterioration rate) 1804, the worst value deterioration rate (the performance worst value deterioration rate) 1805 and the change width deterioration rate (the performance change width deterioration rate) 1806 of each alert, together with the information on the performance deterioration rate of the volumes satisfying the alert conditions.

According to this embodiment, the management server 16, based on the setting for detection of the deteriorated states, monitors the performance index of at least one of the average value, the worst value and the change width of the pre-transfer volume performance history and the post-transfer volume performance history. Upon detection that the set conditions are satisfied, the management server 16 outputs the alert information for specifying the deteriorated state to be monitored, and by sorting the alert information with the performance index and each index of the average value, the worst value, the change width and the volume, can display them as a list on the display unit 20.

Figure 15:
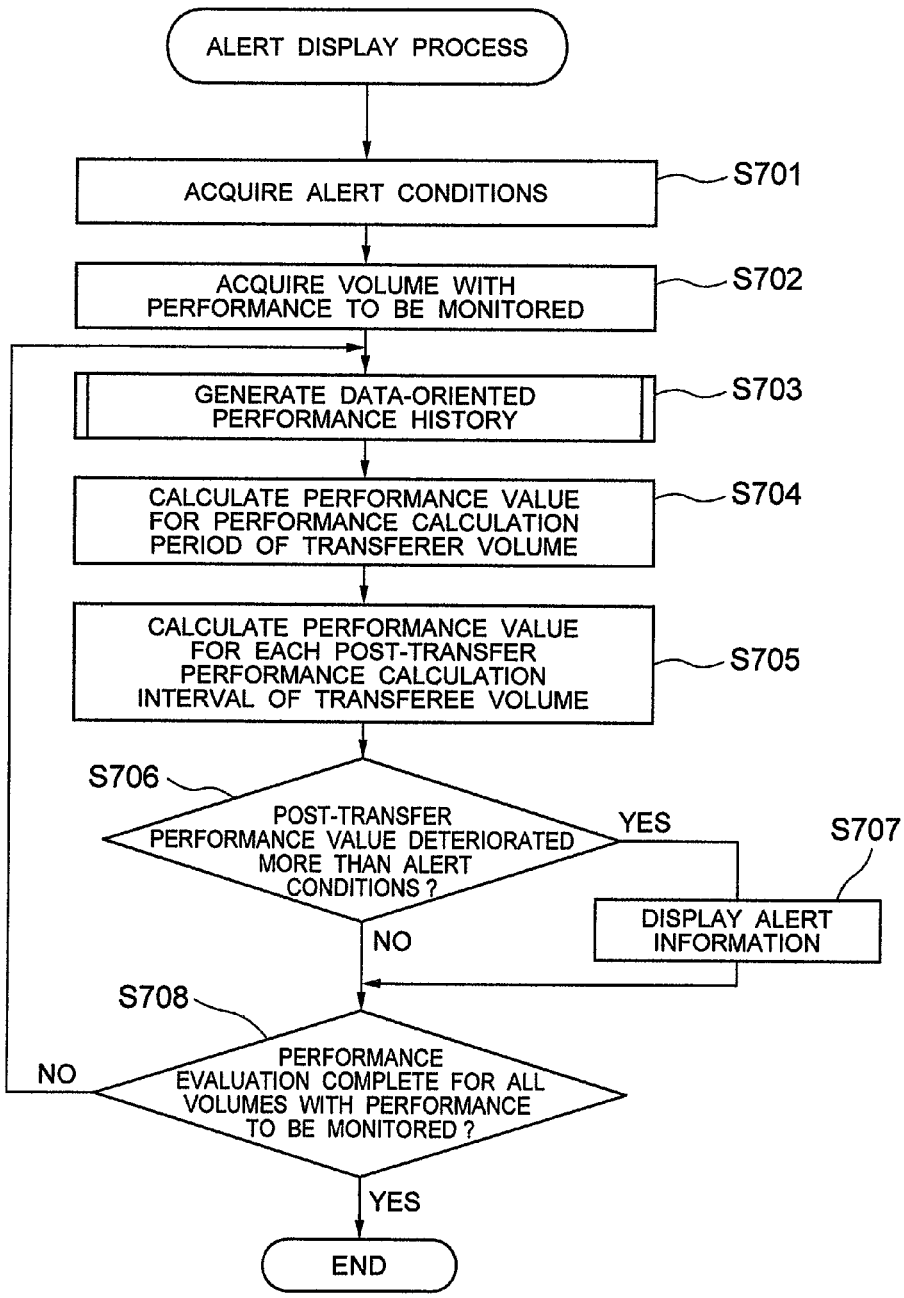
FIG. 15 is a flowchart showing the steps of executing the alert display process in the storage performance monitor program of the management server.

FIG. 15 is a flowchart showing the steps of executing the alert display process for the storage performance monitor program of the management server. The storage performance monitor program 252, first in step S701, acquires the alert conditions designated on the alert display screen 261 of the management client 19.

In step S702, a list of volumes to be monitored is acquired. The volumes to be monitored can be acquired by searching the volumes yet to pass the aforementioned post-transfer performance monitor period using the storage structure information table 229 shown in FIG. 8 with the rearrangement history table 227.

In step S703, the data-oriented performance history is generated, according to the steps described in FIGS. 11 and 12, for the data stored in the volumes to be monitored that have been acquired in step S702.

In step S704, the pre-transfer performance value based on each performance index of the transferer volume during the pre-transfer performance calculation period described above is calculated with reference to FIG. 13.

In step S705, the post-transfer performance value based on each performance index for each of the aforementioned post-transfer performance calculation intervals is calculated with reference to FIG. 13.

Assume that step S706 determines that the deterioration rate of the post-transfer performance value calculated in step S705 based on each performance index with respect to the pre-transfer performance value calculated in step S704 based on each performance index has exceeded the threshold value of the alert conditions acquired in step S701 (YES in step S706). Then, in step S707, the information for specifying the volumes to be monitored that have been deteriorated in performance is output to the alert display screen 261 of the management client 19. After the process of step S707, the control proceeds to step S708. Assume, on the other hand, that step S706 determines that the deterioration rate of the post-transfer performance value calculated in step S705 based on each performance index with respect to the pre-transfer performance value calculated in step S704 based on each performance index has not exceeded the threshold value of the alert conditions acquired in step S701 (NO in step S706). Then, the control proceeds to step S708. In the case where step S708 determines that the evaluation of the performance deterioration of all the volumes to be monitored is completed (YES in step S708), the alert display process is ended. Otherwise (NO in step S708), the control is passed to step S703 in which the performance deterioration of the next volume to be monitored is evaluated.

Figure 16:
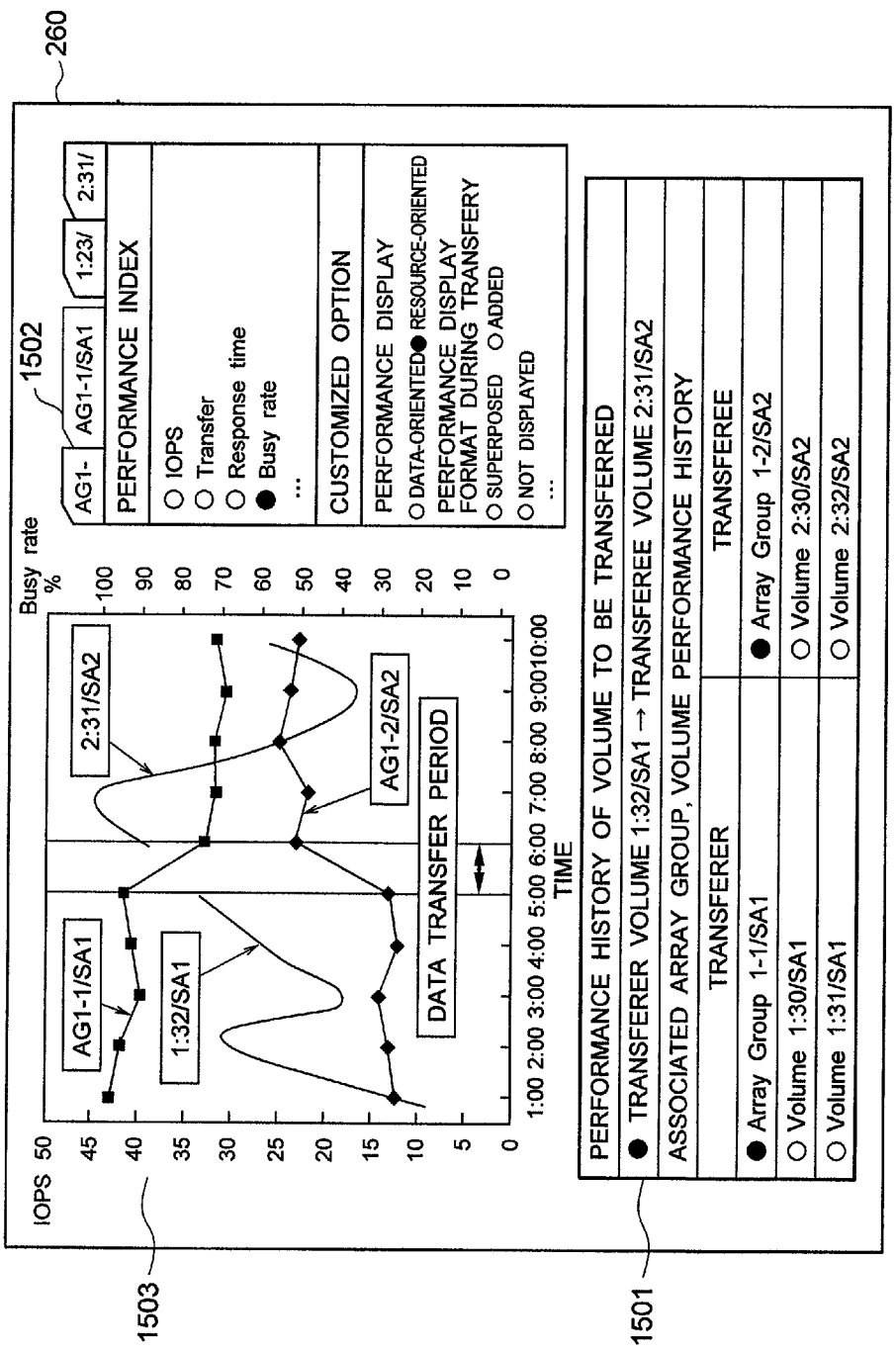
FIG. 16 is a diagram for explaining an example of the performance history display screen in the management client.

FIG. 16 is a diagram for explaining an example of the performance history display screen of the management client. The performance history display screen 260 displays a target resource select area 1501, a performance index/display format select area 1502 and a performance history display area 1503.

The target resource select area 1501 displays the data transferee volumes or the data transferer volumes as the volumes of which the performance history is to be displayed, and a list of resources for the particular volumes of which the performance history can be displayed. The resources to be displayed include the data transferer and data transferee volumes, the array groups associated with the particular volumes and all the other volumes associated with the particular array groups.

In the performance index/display format select area 1502, the user operating the management client 19 designates which performance index of a selected resource is to be displayed in what format (data-oriented or resource-oriented, and whether the performance in transfer is not displayed or superposed). In the case of the data-oriented format, the performance history of the volumes before and after data transfer is displayed. In the case of the resource-oriented format, on the other hand, only the performance history of the designated volumes is displayed even in data transfer. The difference in display format by designation of non-display or superposition for the performance in transfer is described later with reference to FIGS. 17 and 18.

In the performance history display area 1503, the performance history of the resource designated in the target resource select area 1501 is displayed in a format designated by the performance index/display format select area 1502.

Figure 17:
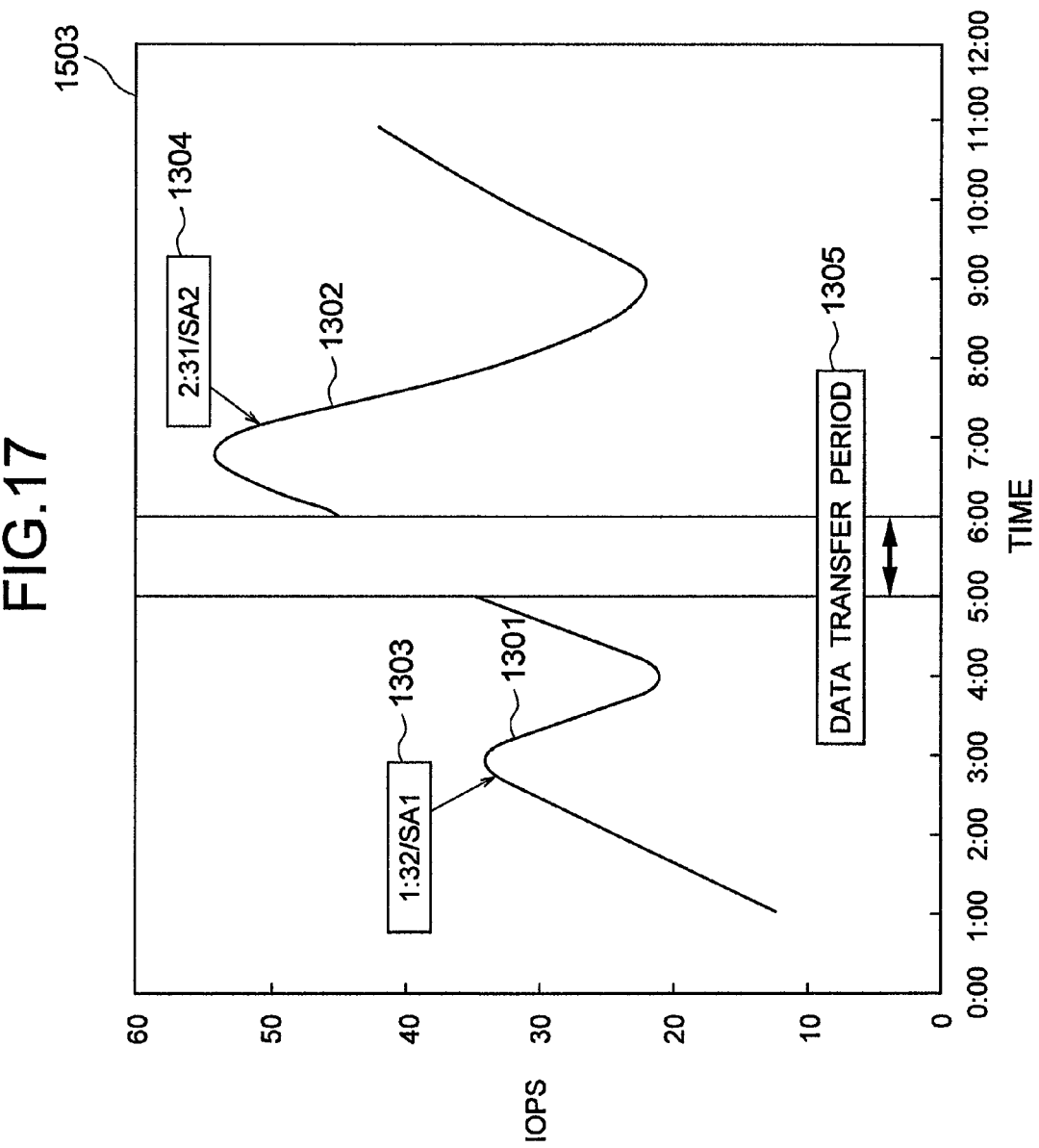
FIG. 17 is a diagram for explaining the graph of the data-oriented performance history in the management client without displaying the performance history during the data transfer period.

FIG. 17 is a diagram for explaining the graph of the data-oriented performance history in the management client with the performance history not displayed for the data transfer period. Specifically, the contents of display in the performance history display area 1503 are shown in the case where the graph of the data-oriented performance history is displayed without the performance history for the data transfer period on the performance history display screen 260 of the management client 19 shown in FIG. 16.

The performance history 1301 of the transferer volume and the performance history 1302 of the transferee volume are displayed as independent graphs, and the graph of neither performance history is displayed during the transfer period. Notations (notes) 1303, 1304 indicating the volume storing the data are displayed for the graphs of the performance history 1301 of the transferer volume and the performance history 1302 of the transferee volume, respectively. On the other hand, a notation 1305 indicating that the data is in transfer is displayed at the position corresponding to the data transfer period.

According to this embodiment, the management server 16 can display the notation describing the reason for the discontinuation at the discontinuous point (for example, the position corresponding to the data transfer period) on the performance history graph of the pre-transfer and post-transfer volumes.

Figure 18:
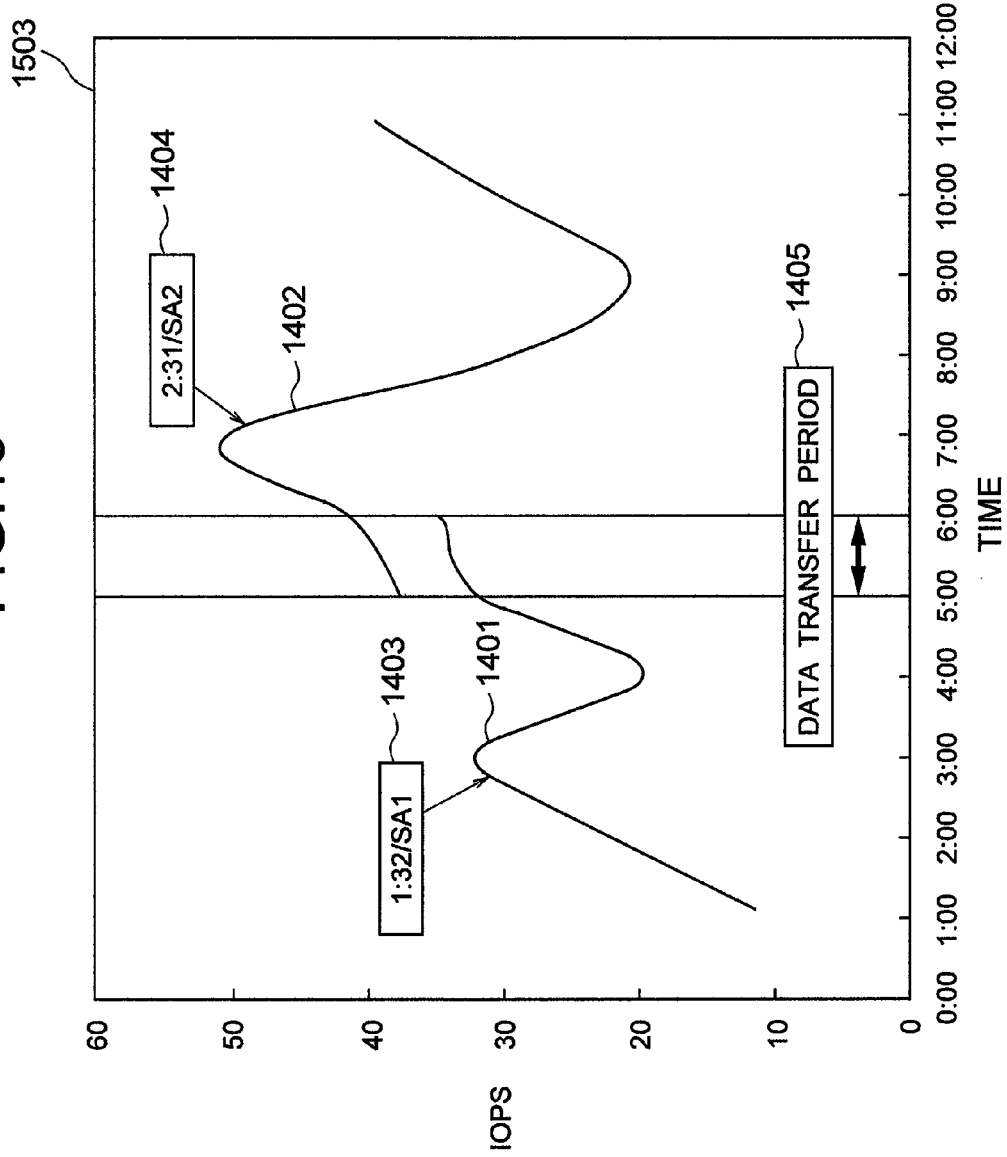
FIG. 18 is a diagram for explaining the graph of the data-oriented performance history in the management client while displaying the volume performance history both before and after data transfer during the data transfer period.

FIG. 18 is a diagram for explaining the graph of the data-oriented performance history of the management client in the case where the volume performance history both before and after data transfer are displayed during the data transfer period. Specifically, in the case where the graph of the data-oriented performance history is displayed on the performance history display screen 260 of the management client 19 shown in FIG. 16, the contents of display in the performance history display area 1503 with the performance history of the transferer and transferee volumes shown superposed one on the other during the data transfer period.

The difference from FIG. 17 lies in that the graphs of both the performance history 1401 of the transferer volume and the performance history 1402 of the transferee volume are displayed in superposition during the data transfer period. FIG. 18 is the same as FIG. 17, however, in that the notations 1403, 1404 indicating the volumes stored in the data are displayed in the graphs of the performance history 1401 of the transferer volume and the performance history 1402 of the transferee volume and the notation 1405 indicating that the data is in transfer is displayed at the position corresponding to the data transfer period.

The graph of FIG. 18 can be displayed by generating the data-oriented performance history 1104 in such a manner that at the time of generating the data storage history information 1103, the rearrangement end time of the record 1111 of the rearrangement history table is set as the storage end time of the record 1120, and the rearrangement start time of the record 1111 of the rearrangement history table 227 is set as the storage start time of the record 1121.

Figure 19:
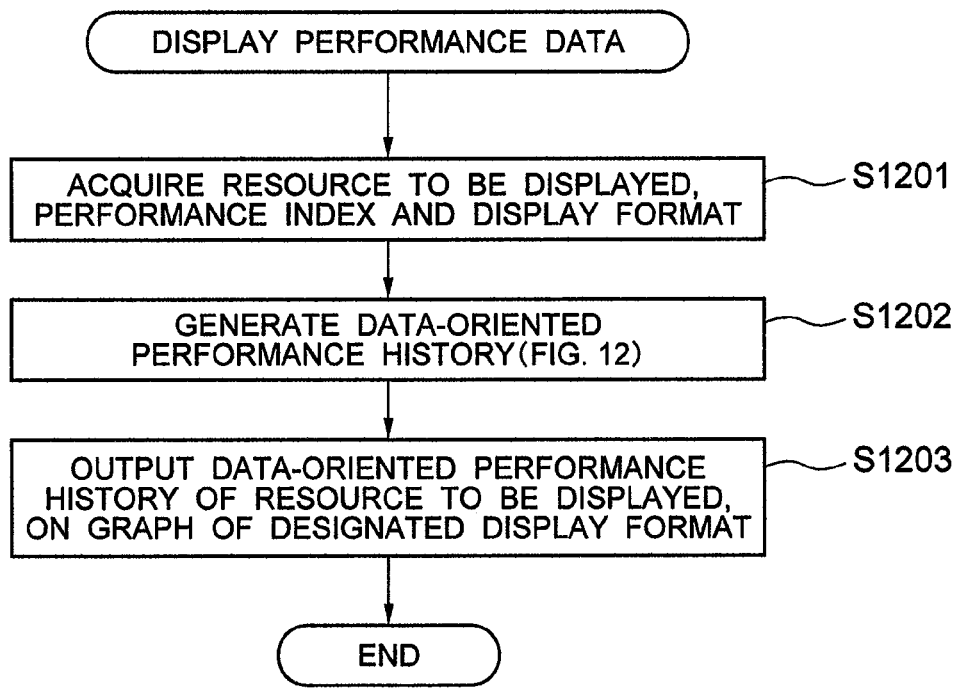
FIG. 19 is a flowchart showing the steps of executing the performance history display for the storage performance monitor program in the management server.

FIG. 19 is a flowchart showing the execution steps for displaying the performance history in the storage performance monitor program of the management server. The storage performance monitor program 252, first in step S1201, acquires the identifier for specifying the resource to be displayed (the volume or the array group), designated on the performance history display screen 260 of the management client 19 shown in FIG. 16, with the performance index to be displayed and the format of performance display.

One or a plurality of identifiers of the volumes or the array groups are acquired. The performance display format indicates whether the performance history of the transferer and transferee volumes during data transfer are displayed in superposition or not displayed. The performance indexes include the access frequency per unit time (IOPS), data transfer performance (Transfer), the CPU availability (busy rate), the response performance (response time) and so on.

In step S1202, the data-oriented performance history 1104 (FIG. 12) for the volumes and the indexes acquired in step S1201 are generated. The process of step S1202 is explained in detail above with reference to FIGS. 11 and 12.

In step S1203, the information for plotting the graph with time and performance value is generated in the display format acquired in step S1201 using the data-oriented performance history 1104 acquired in step S1202. In the case where the display is omitted during data transfer as a display format, the information on the performance value corresponding to the ongoing transfer is not acquired as the data-oriented performance history 1104, while in the case where the display format is the superposition during transfer, on the other hand, both information are acquired.

The information for displaying the volume LDEVID notations attached to the performance history graph and the notation indicating that the data is in transfer during the data transfer period are generated also in step S1203. Based on these information, the performance history graph is generated and output to the performance history display screen 260 of the management client 19.

According to this embodiment, the management server 16 can acquire the storage volume performance information, manage by registering it in the hard disk (storage unit) 164 as time-series storage performance history information, acquire the data rearrangement history information providing the data transfer history between the volumes of the storage from the storage device, and based on the storage performance history information and the data rearrangement history information, manage by registering the performance history of the transferer volume and the performance history of the transferee volume of predetermined data in correspondence with each other in the hard disk 164.

Second Embodiment

Next, a second embodiment of the invention to produce a similar effect to the first embodiment with the storage device having the virtualization function is explained with reference to FIGS. 20 to 30.

Figure 20:
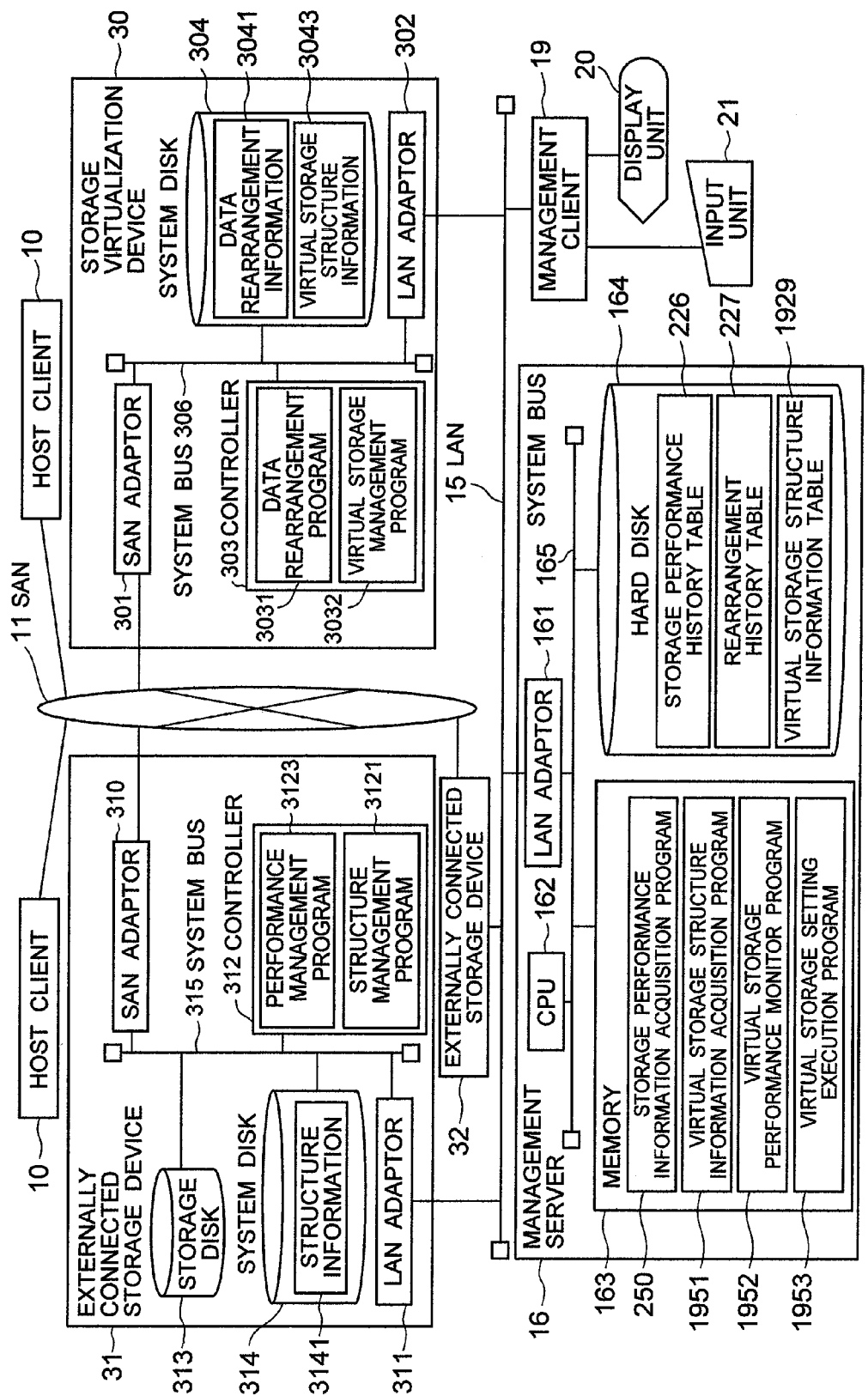
FIG. 20 is a diagram showing the configuration of the system according to a second embodiment of the invention.

FIG. 20 is a diagram showing the system configuration according to the second embodiment of the invention. The difference of FIG. 20 from FIG. 1 in the management server 16 is that the storage structure information acquisition program 251, the storage performance monitor program 252 and the storage setting execution program 253 are replaced by a virtual storage structure information acquisition program 1951, a virtual storage performance monitor program 1952 and a virtual storage setting execution program 1953, respectively, and that the storage structure information table 229 included in the information stored in the hard disk 164 is replaced by a virtual storage structure information table 1929. Further, the SAN 11 is connected with external storage devices (externally connected storage devices) 31, 32 and a storage virtualization device 30 as shown in FIG. 20 instead of the transferer storage device 12 and the transferee storage device 14 shown in FIG. 1. Incidentally, the host client 10, the management client 19, the display unit 20 and the input unit 21 have the same configuration as in FIG. 1 and therefore not described again.

The storage virtualization device 30 includes a SAN adaptor 301, a LAN adaptor 302, a controller 303 and a system disk 304 connected to each other by a system bus 306 thereby to provide the storage virtualization function. The controller 303 has stored thereon a data rearrangement program 3031 and a virtual storage management program 3032, while the system disk 304 has stored thereon data rearrangement information 3041 and virtual storage structure information 3043.

The external storage device 31 includes a SAN adaptor 310, a LAN adaptor 311, a controller 312, a storage disk 313 and a system disk 314 connected to each other by a system bus 315. The controller 312 has stored thereon a structure management program 3121 and a performance management program 3123, while the system disk 314 has stored thereon structure information 3141. The external storage device 32 has a similar configuration to the external storage device 31.

Figure 21:
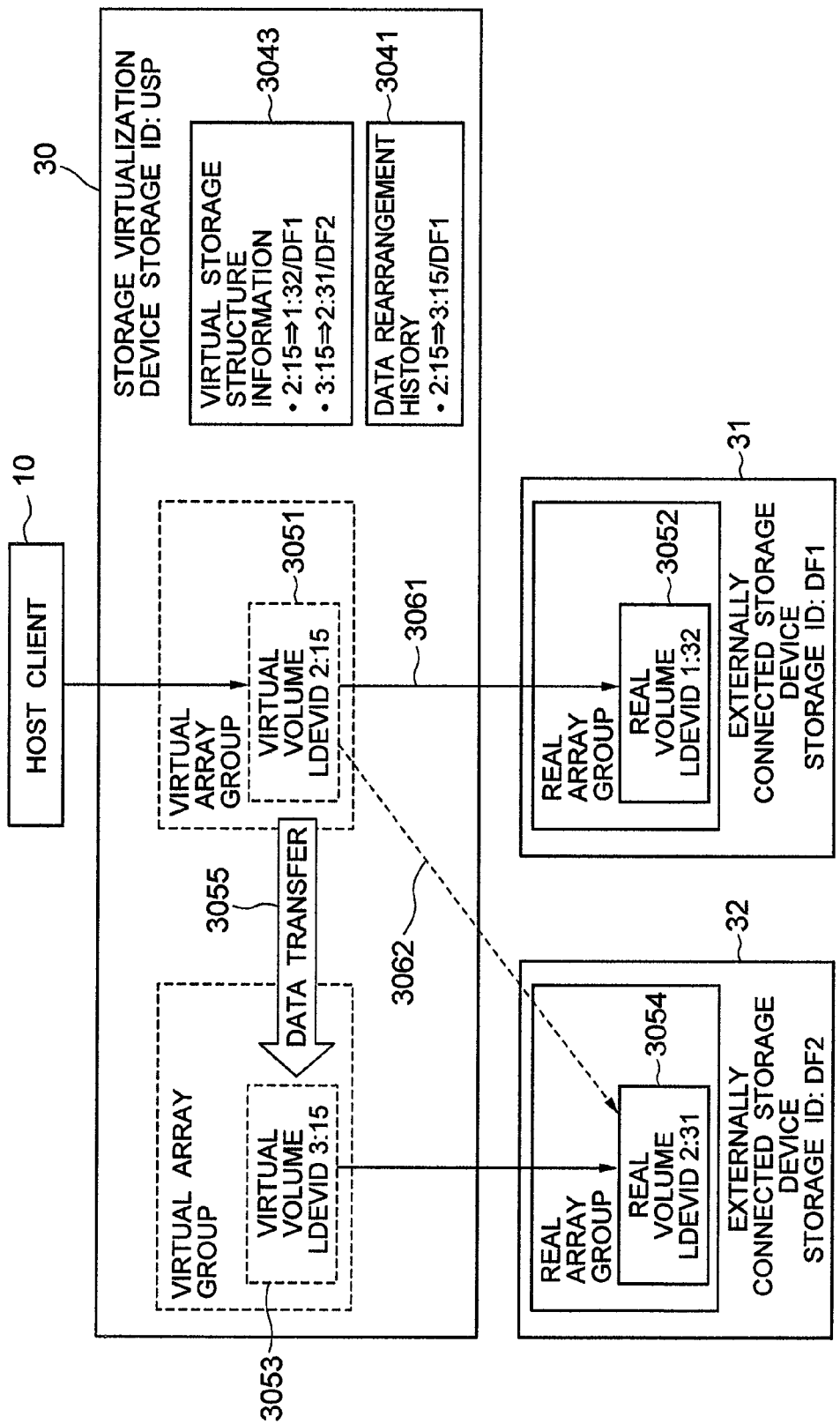
FIG. 21 is a diagram for explaining the storage virtualization function of the storage virtualization device.

FIG. 21 is a diagram for explaining the storage virtualization function of the storage virtualization device, and also referred to FIG. 20 as required in the description that follows. The storage virtualization function of the storage virtualization device 30 includes (a) the function of setting a volume having a real area (hereinafter referred to as the real volume) and a virtual volume having no real area (hereinafter referred to as the virtual volume) in correspondence with each other so that the input/output request from the host client 10 to the virtual volume 3051 is converted into the input/output request to the real volume 3052 (the function of the relation 3061), and (b) the function of changing the correspondence between the virtual volume 3051 and the real volume 3052 to the correspondence between the virtual volume 3051 and the real volume 3054 thus far set in correspondence with the virtual volume 3053 (the function of the relation 3062) after the data transfer 3055 from the virtual volume 3051 to the virtual volume 3053 according to the data rearrangement program 3031.

The result of the correspondence change is stored in the virtual storage structure information 3043. By the storage virtualization function, the access to the data stored in the real volume 3052 of the transferer can be changed to the access to the data stored in the real volume 3054 of the transferee without changing the setting of the host client 10.

The difference from the data transfer according to the first embodiment resides in that unlike in the first embodiment, the data is not transferred for each storage device but for each virtual volume using the storage virtualization device.

Figure 22:
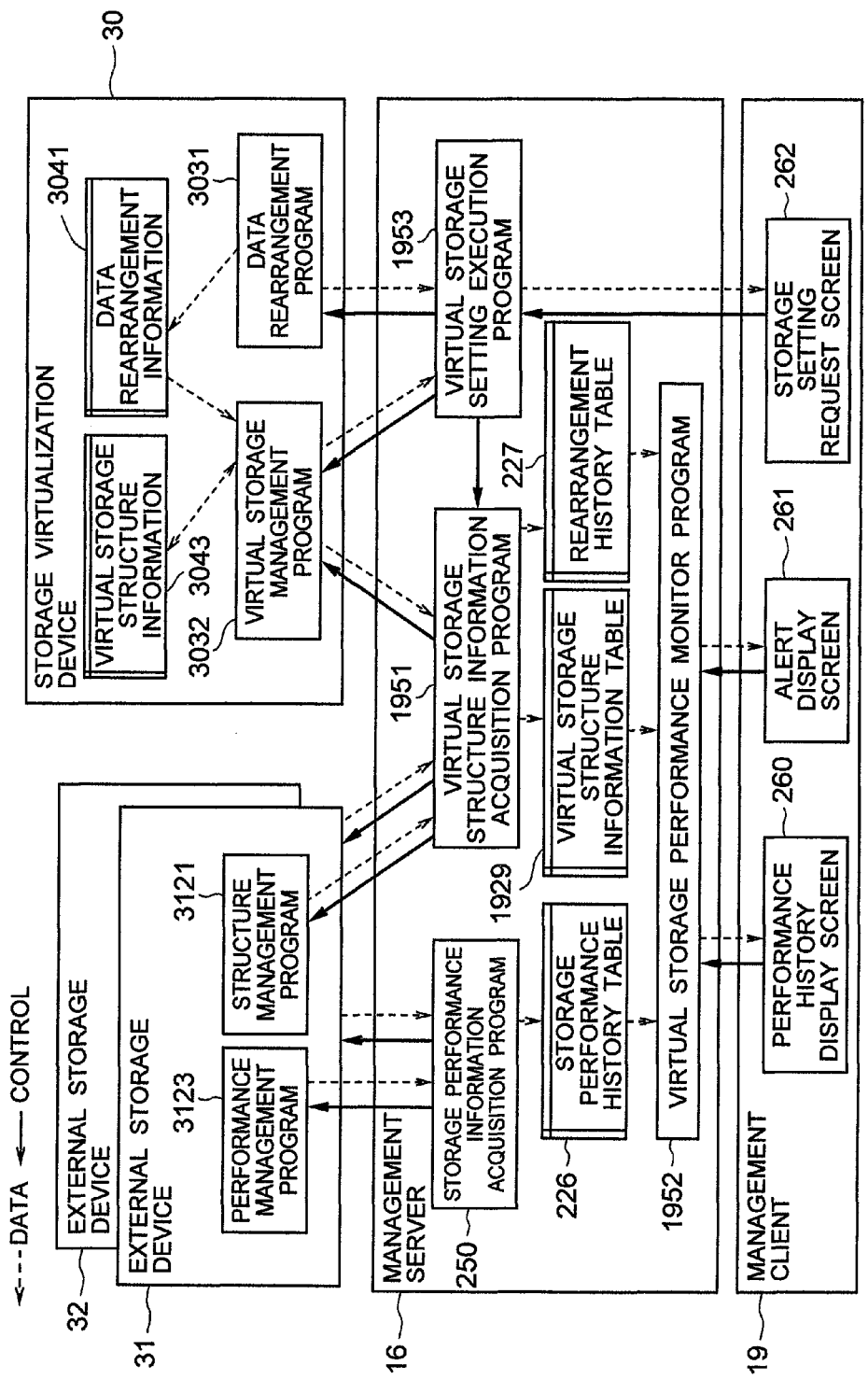
FIG. 22 is a diagram showing the modular relation between the programs operated on the management server and the programs operated on the storage virtualization device and an external storage device according to the second embodiment.

FIG. 22 is a diagram showing the modular relation between the program operating on the management server and the program operating on the storage virtualization device and the external storage device in the second embodiment, and also referred to FIG. 20 as required in the description that follows.

The difference of this diagram from the modular relation diagram according to the first embodiment shown in FIG. 2 is that in the storage virtualization device 30, the data rearrangement information 3041 and the virtual storage structure information 3043 of the virtual volume are managed by the virtual storage management program 3032 instead of by the structure management program 216 of the transferee storage device 14.

Another difference lies in that the storage setting execution program 253, the storage structure information acquisition program 251 and the storage performance monitor program 252 on the management server 16 are replaced by a virtual storage setting execution program 1953, a virtual storage structure information acquisition program 1951 and a virtual storage performance monitor program 1952, respectively.

Further, the storage structure information table 229 on the management server 16 is replaced by a virtual storage structure information table 1929. The external storage devices 31, 32 lack the data rearrangement programs 207, 217 of the transferer storage device 12 and the transferee storage device 14 according to the first embodiment. The other points are not different from the corresponding points of the first embodiment and therefore not described again in this second embodiment.

Figure 23:
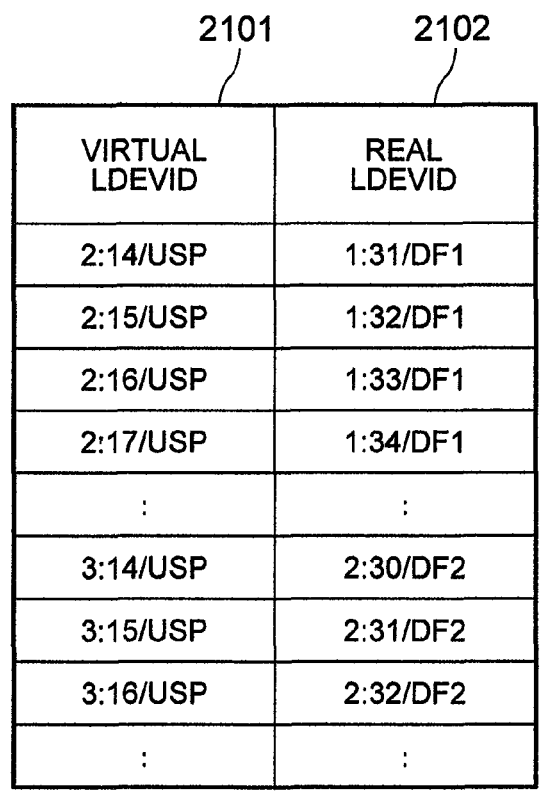
FIG. 23 is a diagram for explaining an example of the virtual volume management information of the storage virtualization device.

FIG. 23 is a diagram for explaining an example of the virtual volume management information of a storage virtualization device. In FIG. 23, the relation is shown between the virtual volume included in the virtual storage structure information 3043 and the real volume. The virtual storage structure information 3043 has stored therein a virtual LDEVID 2101 being an identifier for specifying the virtual volume on the storage virtualization device 30 and a real LDEVID 2102 being an identifier for specifying the real volume of the external storage device corresponding to the virtual volume.

An explanation is given below about the processing steps of the three programs including the virtual storage setting execution program 1953, the virtual storage structure information acquisition program 1951 and the virtual storage performance monitor program 1952 on the management server 16.

Figure 24:
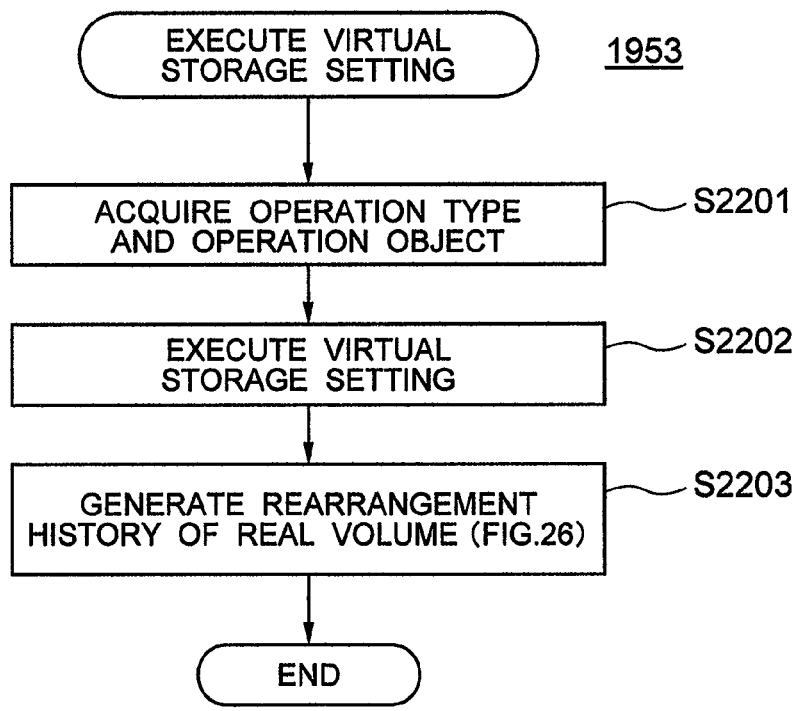
FIG. 24 is a flowchart showing the steps of executing the virtual storage setting execution program in the management server.

FIG. 24 is a flowchart showing the processing steps of the virtual storage setting execution program 1953 in the management server. The virtual storage setting execution program 1953 first acquires the information required for setting a virtual storage in step S2201. The difference in the processing contents from step S401 in the flowchart of the storage setting execution program 253 shown in FIG. 5 lies in that the data transfer using the storage virtualization device 30 is carried out not for each storage device but for each virtual volume by designating the virtual volume on the storage virtualization device 30. In the storage setting request screen 262 (FIG. 3), therefore, the storage device ID for specifying the storage device is not designated but the LDEVID for specifying the virtual volume on the storage virtualization device 30 at the time of data transfer.

In step S2202, based on the information acquired in step S2201, the data rearrangement program 3031 of the storage virtualization device 30 is instructed to transfer the data between the virtual volumes. The data rearrangement program 3031, as shown in FIG. 21, moves the data stored in the real volume corresponding to the virtual volume of the transferer to the real volume corresponding to the virtual volume of the transferee, and upon complete movement, changes the correspondence between the virtual and real volumes.

In step S2203, the virtual storage structure information acquisition program 1951 is requested to acquire the data rearrangement information 3041 and the virtual storage structure information 3043 from the virtual storage management program 3032 of the storage virtualization device 30 and generate the data rearrangement information with real LDEVID from these information.

Figure 25:
FIG. 25 is a diagram for explaining the data structure of the data rearrangement information acquired from the virtual storage management program by the virtual storage structure information acquisition program.

FIG. 25 is a diagram for explaining the data structure of the data rearrangement information acquired by the virtual storage structure information acquisition program from the virtual storage management program. The data rearrangement information 3041 contains the pre-rearrangement LDEVID 2401, the post-rearrangement LDEVID 2402, the rearrangement start time 2403 and the rearrangement end time 2404. Among the acquired data, the LDEVID of the virtual volume of the transferer is stored in the pre-rearrangement LDEVID 2401 and the LDEVID of the virtual volume of the transferee in the post-rearrangement LDEVID 2402. The rearrangement start time 2403 has stored therein the data transfer start time, and the rearrangement end time 2404 the data transfer end time. Upon execution of the new assignment of the virtual volume, the pre-rearrangement LDEVID 2401 and the rearrangement start time 2403 become blank, while upon cancellation of the volume assignment, the post-rearrangement LDEVID 2402 and the rearrangement end time 2404 become blank.

Figure 26:
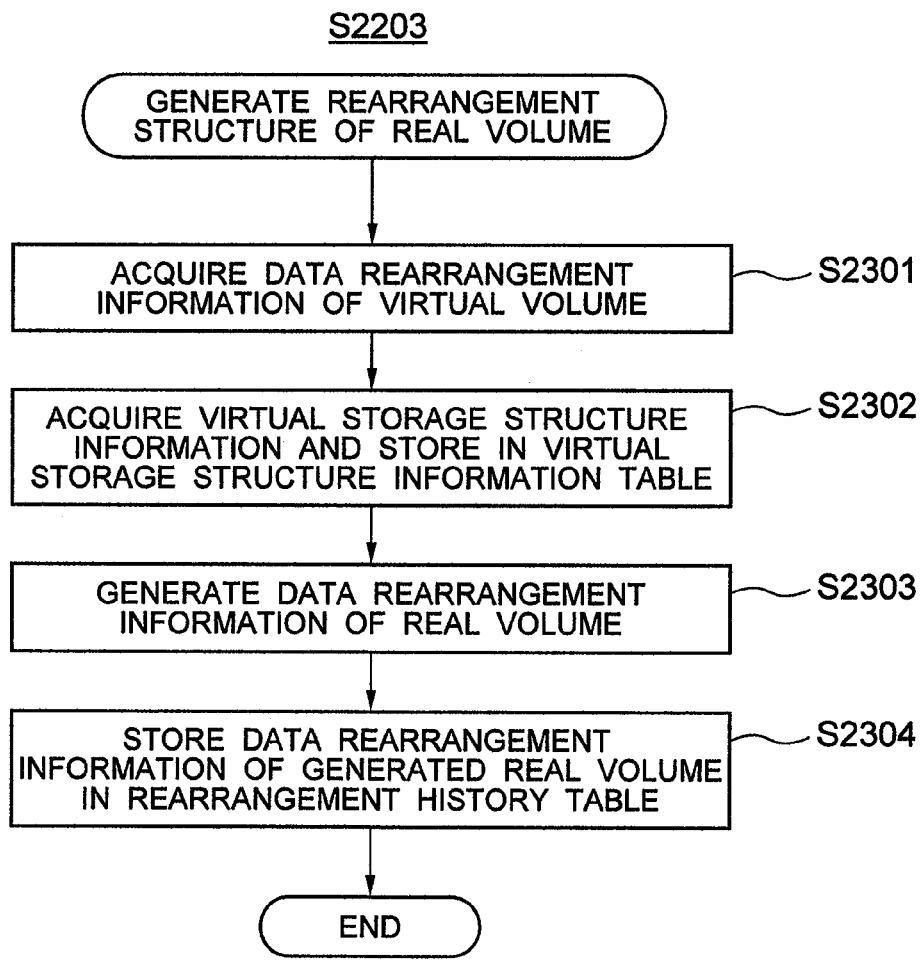
FIG. 26 is a flowchart showing the steps of executing the virtual storage structure information acquisition program in the management server.

FIG. 26 is a flowchart showing the processing steps of the virtual storage structure information acquisition program in the management server. This program is executed in step S2203 of the flowchart of the virtual storage setting execution program 1953 shown in FIG. 24.

The virtual storage structure information acquisition program 1951 first acquires the data rearrangement information 3041 from the system disk 304 through the virtual storage management program 3032 on the controller 303 of the storage virtualization device 30 in step S2301.

In step S2302, the virtual storage structure information 3043 is acquired from the system disk 304 through the virtual storage management program 3032 on the controller 303 of the storage virtualization device 30. The virtual storage structure information thus acquired is stored in the virtual storage structure information table 1929. The data structure of the virtual storage structure information table 1929 is described later with reference to FIG. 28.

In step S2303, the data rearrangement information 3041 and the virtual storage structure information 3043 acquired in steps S2301 and S2302 are set in correspondence with each other. In the process, the correspondence of the virtual storage structure information 3043 acquired in step S2302 to the real volume is changed after data transfer. Thus, the data rearrangement information of the real volume as of the time before data transfer is generated using the data rearrangement information 3041 and the virtual storage structure information 3043. The method of generating the data rearrangement information of the real volume is described later with reference to FIG. 27.

In step S2304, the real LDEV data rearrangement information generated in step S2303, after adding DataID thereto, is stored in the rearrangement history table 227 (FIG. 22) thereby to end the process. The method of generating the DataID of the data rearrangement information of the real volume is similar to step S502 in FIG. 7 and not explained again.

Figure 27:
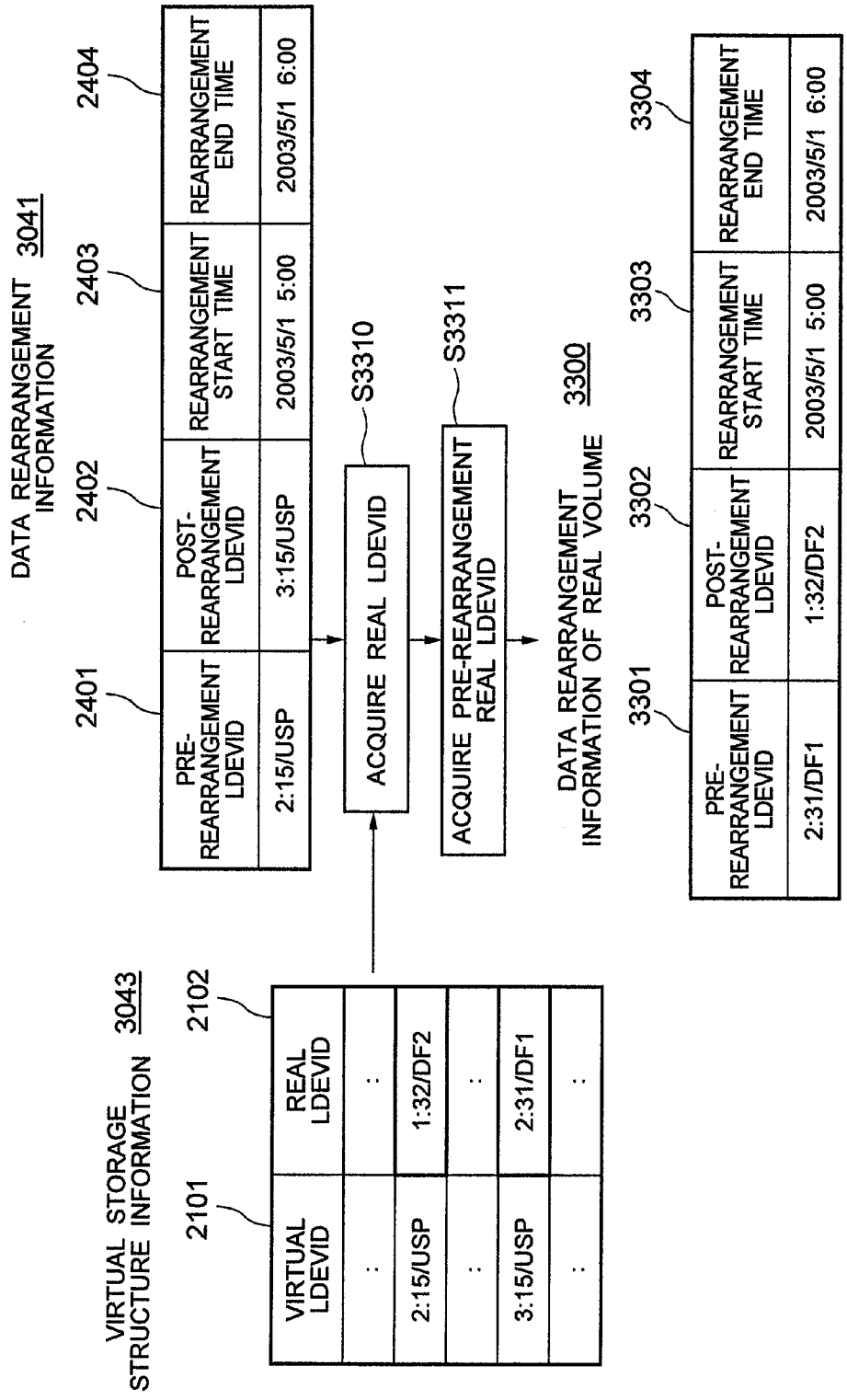
FIG. 27 is a diagram for explaining the method of generating the real volume rearrangement history information.

FIG. 27 is a diagram for explaining the method of generating the real volume rearrangement history information. In the case under consideration, a specific example of the method of generating the data rearrangement information 3300 of the real volume in step S2303 of FIG. 26 is explained. With reference to FIG. 27, an explanation is made about the process of generating the real LDEV data rearrangement information in the case where the contents of the data rearrangement information 3041 acquired in step S2301 of FIG. 26 are 'the pre-rearrangement volume 2:15/USP and the post-rearrangement volume 3:15/USP', and the contents of the virtual storage structure information 3043 acquired in step S2302 of FIG. 26 'the virtual volume 2:15/USP corresponds to the real volume 1:32/DF2 and the virtual volume 3:15/USP corresponds to the real volume 2:31/DF1'.

The contents of the virtual storage structure information 3043 acquired in step S2302 are those after execution of the data transfer, in which the correspondence is changed from that before data transfer. First, therefore, in step S3310, the virtual storage structure information acquisition program 1951 acquires the real LDEVID 2102 of the record for which the pre-rearrangement LDEVID 2401 acquired from the data rearrangement information 3041 is identical to the virtual LDEVID 2101 of the virtual storage structure information 3043. In this case, 1:32/DF2 and 2:31/DF1 are acquired as the real LDEVID corresponding to the virtual LDEVID 2:15/USP and 3:15/USP.

Next, in step S3311, the correspondence between the virtual LDEVID and the real LDEVID is replaced in such a manner as to generate the data rearrangement information "the pre-rearrangement volume 2:31/DF1 and the post-rearrangement volume 1:32/DF2" of the real volume as of the time before execution of the data transfer. The LDEVID of the pre-rearrangement volume and the post-rearrangement volume are stored in the pre-rearrangement LDEVID 3301 and the post-rearrangement LDEVID 3302, respectively, of the data rearrangement information 3300 of the real volume. Further, the rearrangement start time 2403 and the rearrangement end time 2404 of the data rearrangement information 3041 are stored in the rearrangement start time 3303 and the rearrangement end time 3304, respectively, of the data rearrangement information 3300 of the real volume thereby to generate the data rearrangement information 3300 of the real volume.

FIG. 28 is a diagram for explaining the structure information of the virtual volume as an example of the data structure of the virtual storage structure information table in the management server. The virtual storage structure information table 1929 of the virtual volume has registered therein the information including a virtual LDEVID 3001, a virtual storage device ID 3002, a virtual array group ID 3003, a real LDEVID 3004, a real storage device ID 3005 and a real array group ID 3006.

The virtual LDEVID 3001 is an identifier for specifying the virtual volume. The virtual storage device ID 3002 is an identifier for specifying the storage virtualization device storing the virtual volume. The virtual array group ID 3003 is an identifier for specifying the virtual array group for which the virtual volume is generated. The real LDEVID 3004 is an identifier for specifying the real volume corresponding to the virtual volume. The real storage device ID 3005 is an identifier for specifying the storage device for storing the real volume. The real array group ID 3006 is an identifier for specifying the array group for which the real volume is generated.

Figure 29:
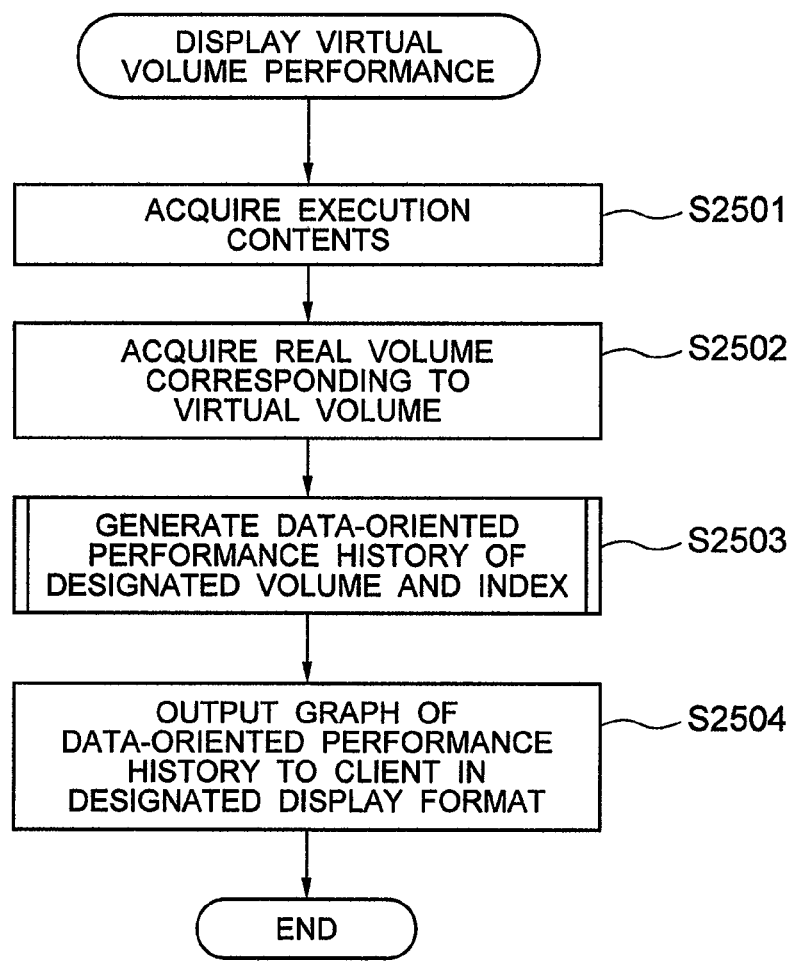
FIG. 29 is a flowchart showing the steps of executing the performance history display process in the virtual storage performance monitor program of the management server.

FIG. 29 is a flowchart showing the processing steps of the performance history display process in the virtual storage performance monitor program of the management server. The virtual storage performance monitor program 1952 acquires the information designated by the user on the performance history display screen 260 of the management client 19 in step S2501. The information acquired include the identifier of the virtual volume of which the history is to be displayed, the performance display format and the performance indexes to be displayed. One or a plurality of the identifiers of the virtual volumes are acquired. The performance display format determines as to whether the performance history is superposed or omitted during data transfer. The performance indexes include the access frequency per unit time (IOPS), the data transfer performance (Transfer), the CPU availability (busy rate), the response performance (response time) and so on.

In step S2502, the information of the real volume corresponding to the virtual volume acquired in step S2501 is acquired using the relation between the virtual volume and the real volume in the virtual storage structure information table 1929.

In step S2503, the data-oriented performance history 1104 relating to the real volume acquired in step S2502 and the performance index acquired in step S2501 is generated. The steps of generating the data-oriented performance history 1104 are explained above with reference to FIGS. 11 and 12.

In step S2504, the information for plotting a graph based on time and the performance value is generated in the display format acquired in step S2501 using the data-oriented performance history 1104 acquired in step S2503. In the case where the display format is such that the display is omitted during the data transfer period, the information on the performance value corresponding to the ongoing transfer is not acquired from the data-oriented performance history 1104, while both information are acquired in the case where the display format is the superposition during the transfer period.

This step S2504 also acquires the relation between the virtual volume and the volume with the data stored therein from the virtual storage structure information table 1929, and generates the information for displaying the notation attached to the performance history graph to indicate the volume LDEVID and the LDEVID of the volume with the data stored therein and the notation indicating that the data is in transfer during the data transfer period. These information are output to the performance history display screen 260 (FIG. 16) of the management client 19.

Figure 30:
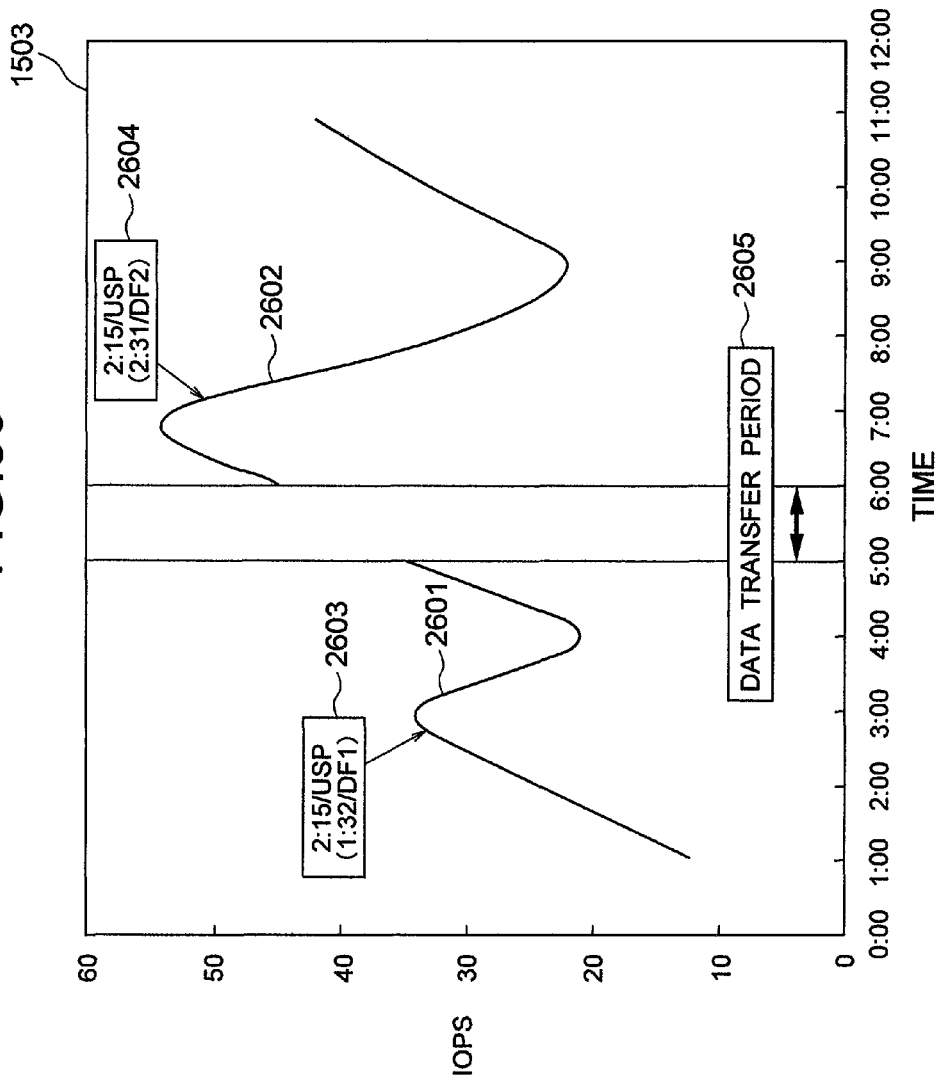
FIG. 30 is a diagram for explaining the graph of the data-oriented performance history of the virtual volume output to the performance history display area on the performance history display screen by the virtual storage performance monitor program of the management client.

FIG. 30 is a diagram for explaining the graph of the data-oriented performance history of the virtual volume output to the performance history display area on the performance history display screen by the virtual storage performance monitor program of the management client. In FIG. 30, the virtual storage performance monitor program 1952 displays the pre-transfer performance history 2601 and the post-transfer performance history 2602 as independent graphs, and both history information are omitted during the transfer period. Then, the virtual storage performance monitor program 1952 displays the notations 2603, 2604 indicating the virtual volume and the volume with the data actually stored therein for the pre-transfer performance history 2601 and the post-transfer performance history 2602. Further, a notation 2605 indicating the data transfer period is displayed.

The alert display process in the virtual storage performance monitor program 1952 is not different from the corresponding process of the first embodiment and not described any more.

According to this embodiment, the management server 16 acquires the performance information of the volume in the storage, manages by registering it as the time-series storage performance history information in a hard disk (storage unit) 164, acquires the data rearrangement history information providing the history of data transfer between the virtual volumes of the storage virtualization device from the storage virtualization device, acquires the virtual volume management information providing the information on the correspondence between the virtual volume of the storage virtualization device and the real volume stored in the storage device from the storage virtualization device, and based on the data rearrangement history information and the virtual volume management information, generates and registers the data rearrangement history information of the real volume indicated by the real volume in the hard disk 164. Then, based on the storage performance history information and the data rearrangement history information of the real volume described above, the performance history of the transferer volume of predetermined data and the performance history of the transferee volume are set in correspondence with each other and managed by being registered in the hard disk 164.

Third Embodiment

Figure 31:
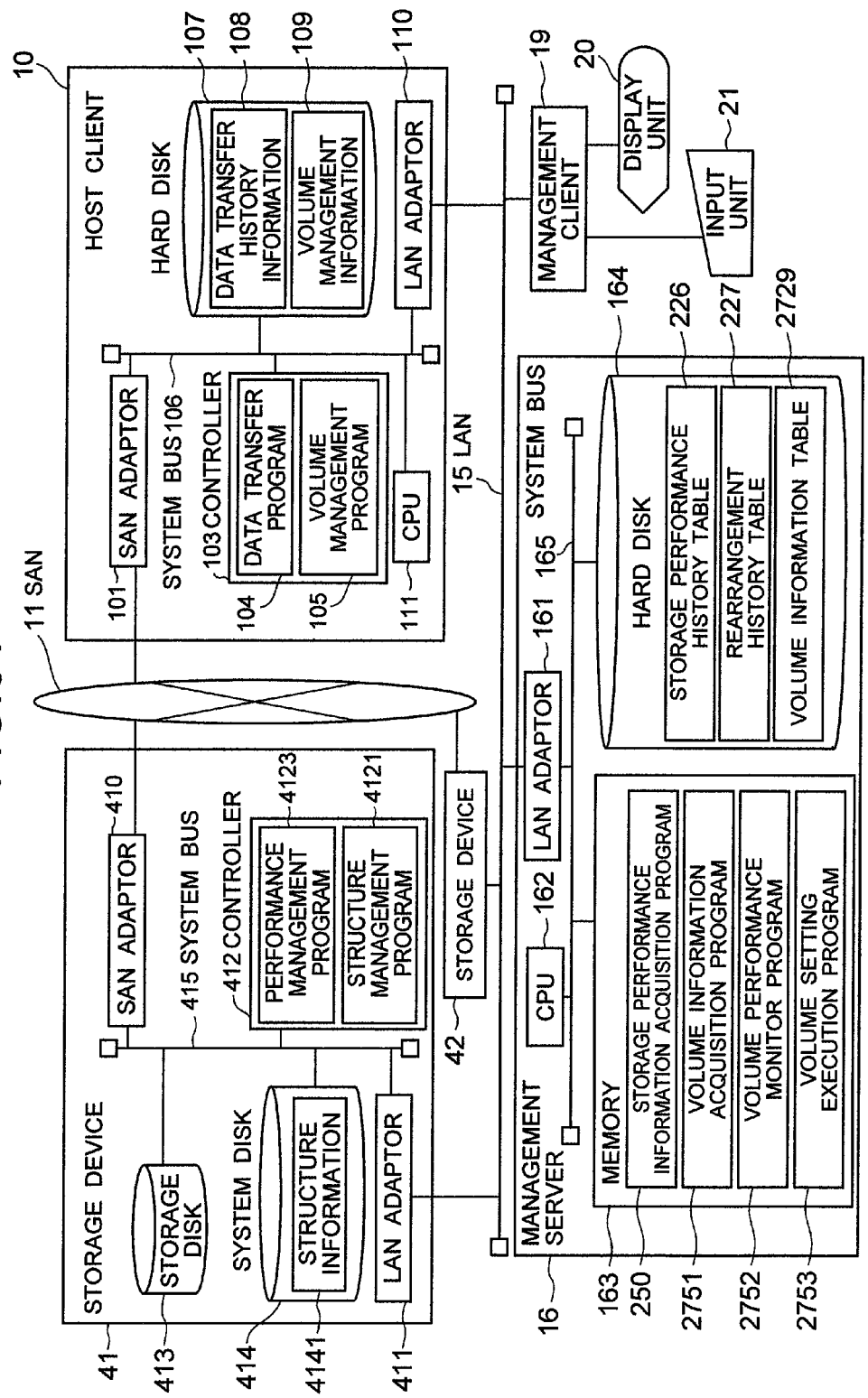
FIG. 31 is a diagram showing the configuration of the system according to a third embodiment of the invention.
Figure 32:
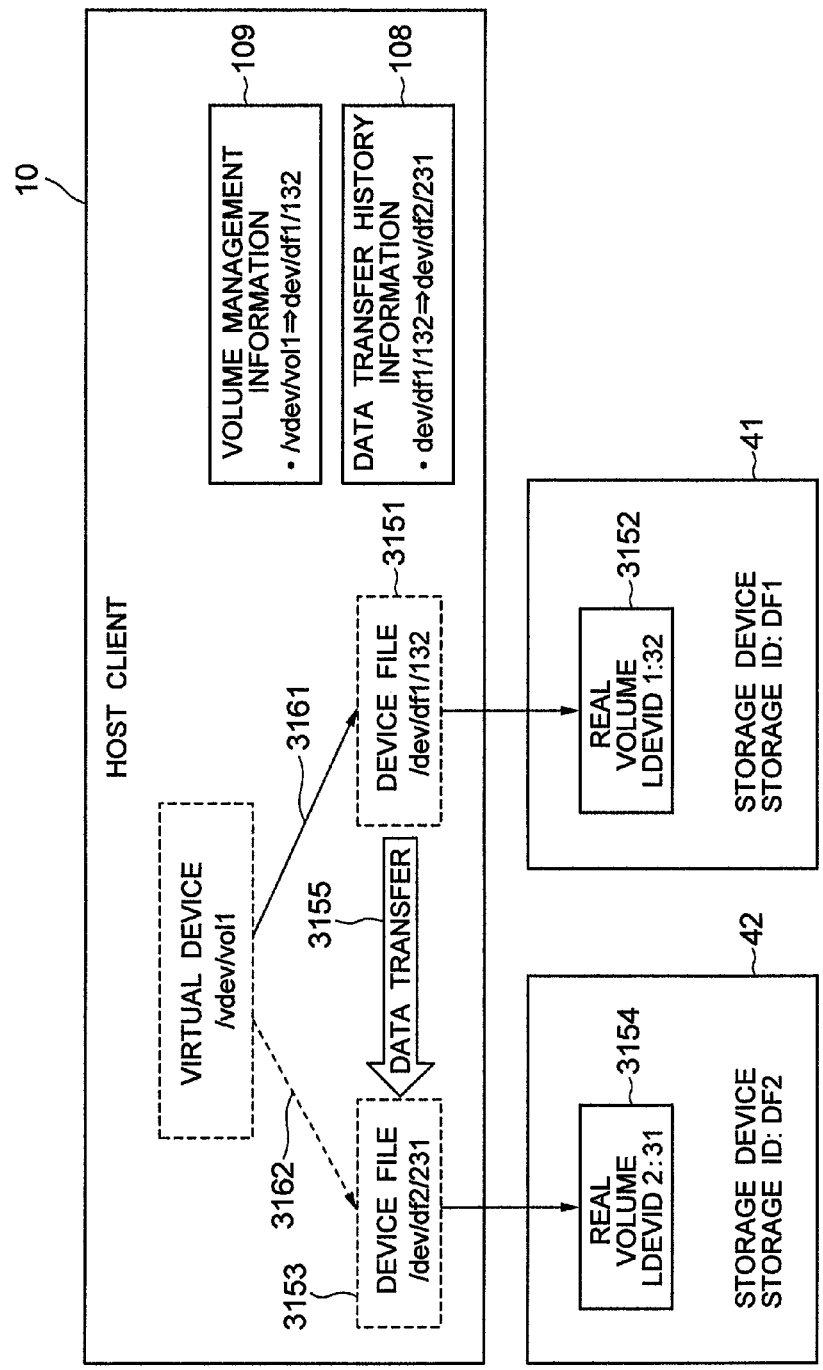
FIG. 32 is a diagram for explaining the function of the volume management program of the host client.
Figure 33:
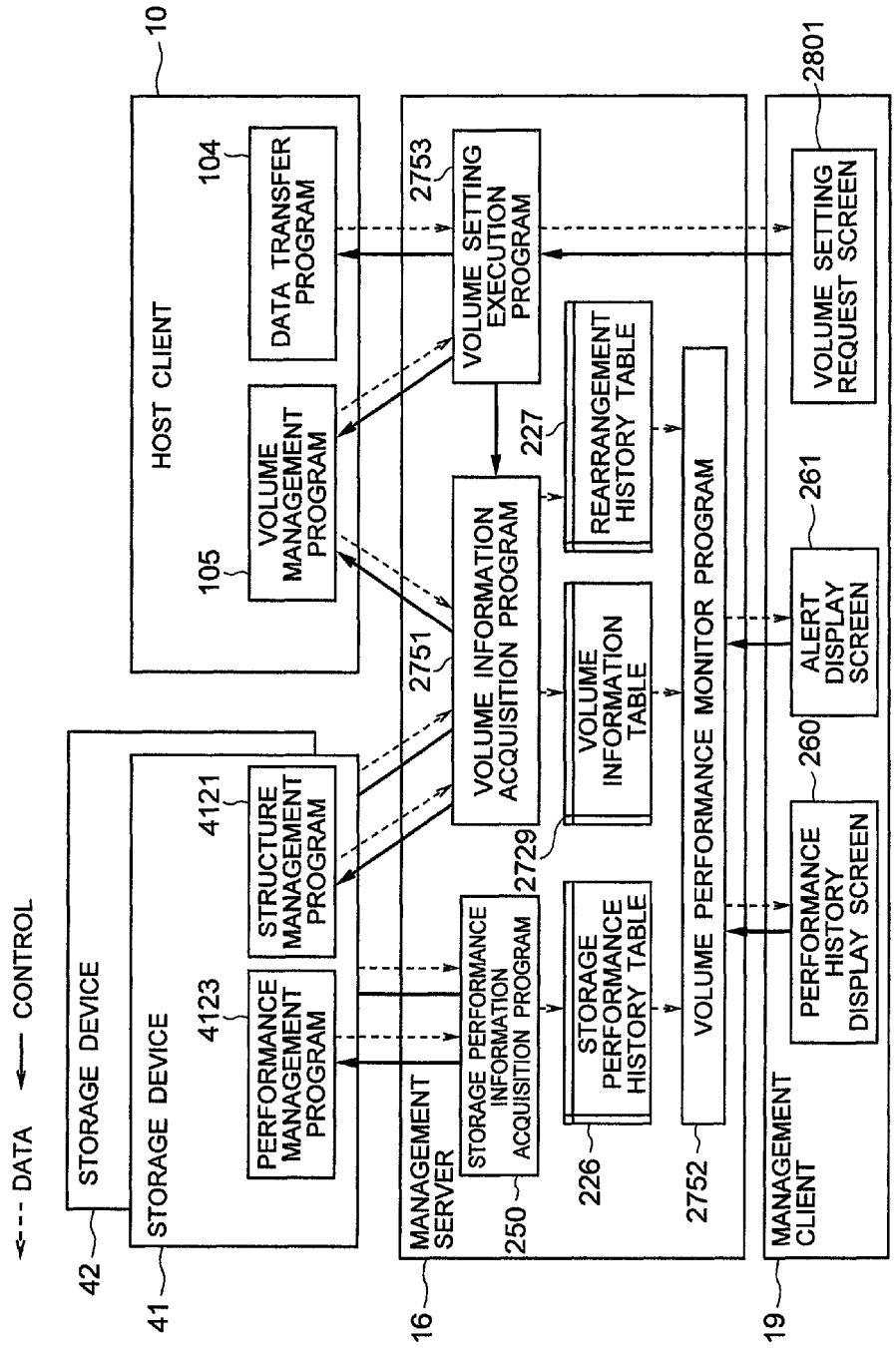
FIG. 33 is a diagram showing the modular relation between the programs operated on the management server and the host client according to the third embodiment.

Next, with reference to FIGS. 31 to 33, an explanation is given about a third embodiment which, like the second embodiment of the invention with the storage device having the virtualization function, produces the similar effect to the second embodiment in realizing the function of the virtual volume on the host client.

Although the second embodiment is explained above with reference to the configuration to realize the function of the virtual volume with the storage device, the function of the virtual volume according to the third embodiment can also be realized similarly on the host client by acquiring the volume management information held by the host client.

FIG. 31 is a diagram showing the configuration of the system according to the third embodiment of the invention. The difference of FIG. 31 from FIG. 20 in the management server 16 lies in that the virtual storage structure information acquisition program 1951, the virtual storage performance monitor program 1952 and the virtual storage setting execution program 1953 are replaced by a volume information acquisition program 2751, a volume performance monitor program 2752 and a volume setting execution program 2753, respectively. Also, the virtual storage structure information table 1929 is replaced by a volume information table 2729. The SAN 11 is connected with a host client 10 and storage devices 41, 42. Incidentally, the configuration of the management client 19, the display unit 20 and the input unit 21 is identical with that shown in the system configuration diagram of FIG. 20 according to the second embodiment, and therefore, is not described any more.

The host client 10 is a computer in which a SAN adaptor 101, a LAN adaptor 110, a CPU 111, a memory 103 and a hard disk 107 are connected to each other through a system bus 106. The memory 103 has stored thereon a data transfer program 104 and a volume management program 105, while the hard disk 107 has stored thereon data transfer history information 108 and volume management information 109.

The storage device 41 has a SAN adaptor 410, a LAN adaptor 411, a controller 412, a storage disk 413 and a system disk 414 connected to each other through a system bus 415. The controller 412 has stored thereon a structure management program 4121 and a performance management program 4123, while the system disk 414 has stored thereon structure information 4141. The storage device 42 has a similar configuration to the storage device 41. These storage devices 41, 42 have the same configuration as the external storage devices 31, 32 according to the second embodiment.

FIG. 32 is a diagram for explaining the function of the volume management program held by the host client. The volume management function of the volume management program 105 is to manage the correspondence between the virtual device file constructed on the OS (operating system) of the host client and the real volume of the storage device through the device file. The real volume to be accessed can be uniquely specified by the device file. In the volume management program 105, therefore, the volume corresponding to the virtual device file can be changed by changing the relation between the virtual device file and the device file (by changing from the relation 3161 to the relation 3162, for example). The information on the correspondence between the virtual device file and the device file is held as the volume management information 109.

At the time of data transfer, the data transfer program 104 executes the data transfer 3155 from the device file 3151 to the device file 3153. In the process, the data is transferred from the real volume 3152 stored in the storage device 41 to the real volume 3154 stored in the storage device 42. Then, the volume management program 105 changes the relation between the virtual device file of the volume management information 109 and the device file and the volume thereby to complete the data transfer.

FIG. 33 is a diagram showing the modular relation between the programs operated on the management server and the host client according to the third embodiment. This modular relation diagram is different from the modular relation diagram according to the second embodiment shown in FIG. 22 in that (a) in the host client 10, the volume management program 105, instead of the virtual storage management program 3032 of the storage virtualization device 30, manages the volume management information 109 and the data transfer history information 108 between the volumes that can be specified by the device file, and (b) the programs on the management server 16 including the virtual storage setting execution program 1953, the virtual storage structure information acquisition program 1951 and the virtual storage performance monitor program 1952 are replaced by a volume setting execution program 2753, a volume information acquisition program 2751 and a volume performance monitor program 2752.

Also, the virtual storage structure information table 1929 on the management server 16 is replaced by a volume information table 2729. The storage devices 41, 42 have the same configuration as the external storage device 31 according to the second embodiment. The storage setting request screen 262 displayed on the management client 19 in the second embodiment is replaced by a volume setting request screen 2801 to the host client 10.

According to the third embodiment, even in the case where the data transfer is executed in the host client, the management by relating the file system providing the data storage destination in the host client to the volume of the storage device makes it possible, as in accessing the data-oriented performance history setting the virtual volume and the real volume in correspondence with each other in the second embodiment, to display the data-oriented performance history setting the file system and the volume in correspondence with each other. This can be realized by the same way as in the second embodiment by replacing the relation between the virtual volume and the real volume with the relation between the virtual device file and the volume, and therefore, the detailed explanation is omitted.

According to the third embodiment, the management server 16 so operates that the performance information of the volume of the storage device is acquired and managed by being registered in the hard disk (storage unit) 164 as the time-series storage performance history information, the data rearrangement information indicated by the virtual device file of the host is acquired from the host client 10, the volume management information providing the information on the correspondence between the virtual device file of the host and the real volume of the storage device is acquired from the host client 10, and based on the data rearrangement information and the volume management information, the data rearrangement information of the real volume indicated by the real volume is generated and registered in the hard disk 164. Thus, the performance history of the transferer volume of predetermined data and the performance history of the transferee volume can be registered in and managed by the hard disk 164 in correspondence with each other based on the storage performance history information and the data rearrangement history information of the real volume.

According to this invention, the management server 16 so operates that the data-oriented performance history providing the logical place of storage of the data stored in the volume is generated using the storage performance monitor program 252 based on the rearrangement history information providing the information on the history of transfer of the data stored in the rearrangement history table 227 and the volume of the storage device by the storage structure information acquisition program 251, the storage structure information stored in the storage structure information table 229 and the performance history of each volume stored in the storage performance history table 226 by the storage performance information acquisition program 250. In this way, the performance history graph can be displayed or the performance change detected to display an alert.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of managing a performance history in a system including at least one storage device, a storage virtualization device for setting a real volume providing a real area of the storage device, a virtual volume, the real volume and the virtual volume being in correspondence with each other, and a management server for managing the storage and the storage virtualization device, wherein data stored in the volume of the storage device is transferred to another volume for a data arrangement, the method comprising the steps of:

acquiring performance information of the volume of the storage device and managing by registering the performance information in a memory unit as time-series storage performance history information;

acquiring, from the storage virtualization device, data rearrangement history information providing a history of data transfer between virtual volumes of the storage virtualization device for the data arrangement;

acquiring, from the storage virtualization device, virtual volume management information providing information on a correspondence between the virtual volume of the storage virtualization device and the real volume stored in the storage;

generating and registering in the memory unit the data rearrangement history information of the real volume indicated by the real volume based on the data rearrangement history information and the virtual volume management information;

managing by registering in the memory unit a performance history of a transferer volume of predetermined data and a performance history of a transferee volume in correspondence with each other, based on the storage performance history information and the data rearrangement history information of the real volume, wherein data is transferred from the transferer volume to the transferee volume for the data rearrangement; and generating data-oriented performance history, based on the performance history of the transferer volume and the performance history of the transferee volume, wherein the data-oriented performance history is generated in correspondence with a life cycle of the predetermined data, the life cycle including a new assignment of the volume of the storage device, the transfer of the predetermined stored in the volume to another volume, and the period before cancellation of an assignment of the transferee volume, for management of the performance history of the predetermined data.

2. The method of performance history management according to claim 1, wherein a graph of the performance history is generated in accordance with a predetermined display specification from the data-oriented performance history and displayed on a display unit, and wherein a graph of the performance history of the transferer volume and a graph of the performance history of the transferee volume are displayed independently of each other based on the data-oriented performance history information, together with the information for specifying the transferer volume and the transferee volumes as added to the graphs.

3. A method of managing a performance history in a system including at least one storage device, a storage virtualization device for setting a real volume providing a real area of the storage device, a virtual volume, the real volume and the virtual volume being in correspondence with each other, and a management server for managing the storage and the storage virtualization device, wherein data stored in the volume of the storage device is transferred to another volume for a data arrangement, the method comprising the steps of:

acquiring performance information of the volume of the storage device and managing by registering the performance information in a memory unit as time-series storage performance history information;

acquiring, from the storage virtualization device, data rearrangement history information providing a history of data transfer between virtual volumes of the storage virtualization device for the data arrangement;

acquiring, from the storage virtualization device, virtual volume management information providing information on a correspondence between the virtual volume of the storage virtualization device and the real volume stored in the storage;

generating and registering in the memory unit the data rearrangement history information of the real volume indicated by the real volume based on the data rearrangement history information and the virtual volume management information;

managing by registering in the memory unit a performance history of a transferer volume of predetermined data and a performance history of a transferee volume in correspondence with each other, based on the storage performance history information and the data rearrangement history information of the real volume, wherein data is transferred from the transferer volume to the transferee volume for the data rearrangement; and generating data-oriented performance history, based on the performance history of the transferer volume and the performance history of the transferee volume, wherein a graph of the performance history is generated according to a predetermined display specification from the data-oriented performance history information and displayed on a display unit, and wherein a graph of the performance history of the transferer volume and a graph of the performance history of the transferee volume are displayed independently of each other based on the data-oriented performance history information, together with the information for specifying the transferer volume and the transferee volumes as added to the graphs.

4. The method of performance history management according to claim 3, wherein the graph of the performance history of the transferer volume and the graph of the performance history of the transferee volume are displayed by attaching a reason of discontinuity at a discontinuous point of the graphs.

5. The method of performance history management according to claim 3, wherein the graph of the performance history of the transferer volume and the graph of the performance history of the transferee volume are displayed independently of each other in a time-series, based on the data-oriented performance history information, and both a performance value of the transfer volume and a performance value of the transferee volume are displayed for the performance history during a data transfer period.

6. The method of performance history management according to claim 3, wherein the graph of the performance history of the transferer volume and the graph of the performance history of the transferee volume are displayed independently of each other in a time-series, based on the data-oriented performance history information, and the performance is not displayed for the performance history during a data transfer period.

7. The method of performance history management according to claim 2, wherein at least one of the resources associated with the volumes before and after the data transfer are designated from an input unit for receiving an instruction from an external source thereby to display a graph of the performance history of the selected resource in accordance with a predetermined display specification.

8. A method of managing a performance history in a system including at least one storage device, a storage virtualization device for setting a real volume providing a real area of the storage device, a virtual volume, the real volume and the virtual volume being in correspondence with each other, and a management server for managing the storage and the storage virtualization device, wherein data stored in the volume of the storage device is transferred to another volume for a data arrangement, the method comprising the steps of:

acquiring performance information of the volume of the storage device and managing by registering the performance information in a memory unit as time-series storage performance history information;

acquiring, from the storage virtualization device, data rearrangement history information providing a history of data transfer between virtual volumes of the storage virtualization device for the data arrangement;

acquiring, from the storage virtualization device, virtual volume management information providing information on a correspondence between the virtual volume of the storage virtualization device and the real volume stored in the storage;

generating and registering in the memory unit the data rearrangement history information of the real volume indicated by the real volume based on the data rearrangement history information and the virtual volume management information;

managing by registering in the memory unit a performance history of a transferer volume of predetermined data and a performance history of a transferee volume in correspondence with each other, based on the storage performance history information and the data rearrangement history information of the real volume, wherein data is transferred from the transferer volume to the transferee volume for the data rearrangement; and generating data-oriented performance history, based on the performance history of the transferer volume and the performance history of the transferee volume, wherein based on the data-oriented performance history information, the pre-transfer performance value of the transferer volume during the predetermined period is calculated, the post-transfer performance value during the predetermined period of the post-transfer volume is calculated, and the pre-transfer performance value and the post-transfer performance value are compared with each other thereby to detect the performance deterioration.

9. The method of performance history management according to claim 8, wherein the performance history of the transferer volume and the performance history of the transferee volume are monitored for at least one of a plurality of performance indexes including an average value, a worst value and a change width of the performance history, based on a setting for detection of a deteriorated state, and upon detection that set conditions are satisfied, alert information providing the information for specifying a target to be monitored which has been deteriorated is output.

10. A method of managing a performance history in a system including at least one storage device and a host for continuously accessing a transferee volume by setting a real volume providing a real area of the storage device and a virtual device file, the real volume and the virtual device file being in correspondence with each other, and changing a correspondence between the virtual device file and the real volume after data transfer between real volumes, wherein data stored in a volume of the storage device is transferred to another volume and a management server for maintaining the storage device and the host, the method comprising the steps of:

acquiring performance information of the volume of the storage device and managing by registering performance information in a memory unit as time-series storage performance history information;

acquiring data rearrangement information indicated by the virtual device file of the host from the host;

acquiring, from the host, volume management information providing information on a correspondence between the virtual device file of the host and the real volume of the storage device;

generating and registering in the memory unit data rearrangement information of a real volume indicated by the real volume based on the data rearrangement information and the volume management information;

managing by registering in the memory unit a performance history of a transferer volume of predetermined data and a performance history of a transferee volume, based on the storage performance history information and the data rearrangement history information of the real volume, wherein data is transferred from the transferer volume to the transferee volume for the data rearrangement; and generating data-oriented performance history, based on the performance history of the transferer volume and the performance history of the transferee volume, wherein the data-oriented performance history is generated in correspondence with a life cycle of the predetermined data, the life cycle including a new assignment of the volume of the storage device, the transfer of the predetermined stored in the volume to another volume, and the period before cancellation of an assignment of the transferee volume, for management of the performance history of the predetermined data.

11. The method of performance history management according to claim 10, wherein a graph of the performance history is generated in accordance with a predetermined display specification from the data-oriented performance history and displayed on a display unit, and wherein a graph of the performance history of the transferer volume and a graph of the performance history of the transferee volume are displayed independently of each other based on the data-oriented performance history information, together with the information for specifying the transferer volume and the transferee volumes as added to the graphs.

12. A method of managing a performance history in a system including at least one storage device and a host for continuously accessing a transferee volume by setting a real volume providing a real area of the storage device and a virtual device file, the real volume and the virtual device file being in correspondence with each other, and changing a correspondence between the virtual device file and the real volume after data transfer between real volumes, wherein data stored in a volume of the storage device is transferred to another volume and a management server for maintaining the storage device and the host, the method comprising the steps of:

acquiring performance information of the volume of the storage device and managing by registering performance information in a memory unit as time-series storage performance history information;

acquiring data rearrangement information indicated by the virtual device file of the host from the host;

acquiring, from the host, volume management information providing information on a correspondence between the virtual device file of the host and the real volume of the storage device;

generating and registering in the memory unit data rearrangement information of a real volume indicated by the real volume, based on the data rearrangement information and the volume management information; and managing by registering in the memory unit a performance history of a transferer volume of predetermined data and a performance history of a transferee volume, based on the storage performance history information and the data rearrangement history information of the real volume, wherein data is transferred from the transferer volume to the transferee volume for the data rearrangement; and generating data-oriented performance history, based on the performance history of the transferer volume and the performance history of the transferee volume, wherein a graph of the performance history is generated according to a predetermined display specification from the data-oriented performance history information and displayed on a display unit, wherein a graph of the performance history of the transferer volume and a graph of the performance history of the transferee volume are displayed independently of each other based on the data-oriented performance history information, together with the information for specifying the transferer volume and the transferee volumes as added to the graphs.

13. The method of performance history management according to claim 12, wherein the graph of the performance history of the transferer volume and the graph of the performance history of the transferee volume are displayed by attaching a reason of discontinuity at a discontinuous point of the graphs.

14. The method of performance history management according to claim 12, wherein the graph of the performance history of the transferer volume and the graph of the performance history of the transferee volume are displayed independently of each other in a time-series, based on the data-oriented performance history information, and both a performance value of the transfer volume and a performance value of the transferee volume are displayed for the performance history during a data transfer period.

15. The method of performance history management according to claim 12, wherein the graph of the performance history of the transferer volume and the graph of the performance history of the transferee volume are displayed independently of each other in a time-series, based on the data-oriented performance history information, and the performance is not displayed for the performance history during a data transfer period.

16. The method of performance history management according to claim 12, wherein at least one of the resources associated with the volumes before and after the data transfer are designated from an input unit for receiving an instruction from an external source thereby to display a graph of the performance history of the selected resource in accordance with a predetermined display specification.

17. A method of managing a performance history in a system including at least one storage device and a host for continuously accessing a transferee volume by setting a real volume providing a real area of the storage device and a virtual device file, the real volume and the virtual device file being in correspondence with each other, and changing a correspondence between the virtual device file and the real volume after data transfer between real volumes, wherein data stored in a volume of the storage device is transferred to another volume and a management server for maintaining the storage device and the host, the method comprising the steps of:

acquiring performance information of the volume of the storage device and managing by registering performance information in a memory unit as time-series storage performance history information;

acquiring data rearrangement information indicated by the virtual device file of the host from the host;

acquiring, from the host, volume management information providing information on a correspondence between the virtual device file of the host and the real volume of the storage device;

generating and registering in the memory unit data rearrangement information of a real volume indicated by the real volume based on the data rearrangement information and the volume management information;

managing by registering in the memory unit a performance history of a transferer volume of predetermined data and a performance history of a transferee volume, based on the storage performance history information and the data rearrangement history information of the real volume, wherein data is transferred from the transferer volume to the transferee volume for the data rearrangement; and generating data-oriented performance history, based on the performance history of the transferer volume and the performance history of the transferee volume, wherein based on the data-oriented performance history information, the pre-transfer performance value of the transferer volume during the predetermined period is calculated, the post-transfer performance value during the predetermined period of the post-transfer volume is calculated, and the pre-transfer performance value and the post-transfer performance value are compared with each other thereby to detect the performance deterioration.

18. The method of performance history management according to claim 17, wherein the performance history of the transferer volume and the performance history of the transferee volume are monitored for at least one of a plurality of performance indexes including an average value, a worst value and a change width of the performance history, based on a setting for detection of a deteriorated state, and upon detection that set conditions are satisfied, alert information providing the information for specifying a target to be monitored which has been deteriorated is output.

* * * * *